(12) United States Patent
Kamentser et al.

(10) Patent No.: US 11,794,099 B1
(45) Date of Patent: Oct. 24, 2023

(54) UNIVERSAL CONTROLLER AND ASSOCIATED METHODS THEREOF

(71) Applicant: Bokam Engineering Inc., Santa Ana, CA (US)

(72) Inventors: Boris Kamentser, Fountain Valley, CA (US); Eugenia Kamentser, Fountain Valley, CA (US)

(73) Assignee: Bokam Engineering Inc., Santa Ana, CA (US)

( * ) Notice: Subject to any disclaimer, the term of this patent is extended or adjusted under 35 U.S.C. 154(b) by 161 days.

(21) Appl. No.: 17/111,345

(22) Filed: Dec. 3, 2020

Related U.S. Application Data

(60) Provisional application No. 62/944,530, filed on Dec. 6, 2019.

(51) Int. Cl.
*A63F 13/24* (2014.01)

(52) U.S. Cl.
CPC ................... *A63F 13/24* (2014.09)

(58) Field of Classification Search
None
See application file for complete search history.

(56) References Cited

U.S. PATENT DOCUMENTS 10,868,436 B1 * 12/2020 Chen ...................... A63F 13/23

\* cited by examiner

*Primary Examiner* — Peter J Iannuzzi
(74) *Attorney, Agent, or Firm* — LOZA & LOZA, LLP; Tejinder Singh

(57) ABSTRACT

A universal controller having a housing is provided. The housing includes a first curved segment and a second curved segment, the first curved segment located on a first side of the housing and the second curved segment located on an opposite, second side of the housing, the first curved segment and the second curved segment symmetrical in shape and begin from a front surface of the housing and end at a rear surface of the housing enabling a user to grip a first side wall at a rear side of the housing and a second side wall at the rear side of the housing; and a cavity created at a bottom segment of the housing, the bottom segment coupled to a bottom support structure for receiving a first battery and a second battery to provide power to a plurality of electronic components of the universal controller.

10 Claims, 31 Drawing Sheets

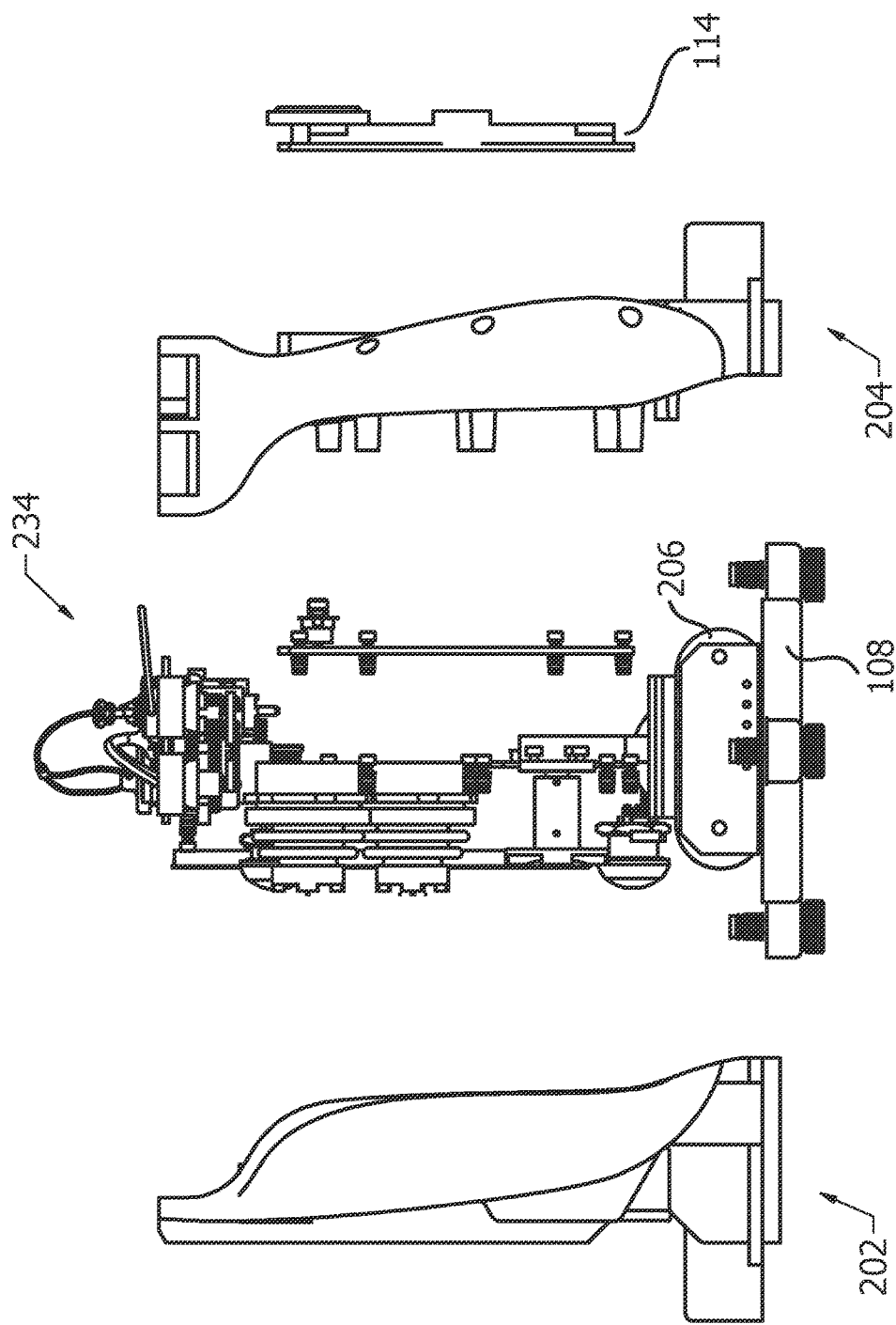

UNIVERSAL CONTROLLER AND ASSOCIATED METHODS THEREOF

CROSS-REFERENCE TO RELATED APPLICATIONS

This patent application claims priority under 35 U.S.C. § 119 (e) to U.S. Provisional Patent Application, Ser. No. 62/944,530, entitled "UNIVERSAL CONTROLLER AND ASSOCIATED METHODS THEREOF" filed on Dec. 6, 2019, the disclosure of which is incorporated herein in its entirety.

TECHNICAL FIELD

The present disclosure relates to universal controllers and associated methods thereof.

BACKGROUND

Universal controllers are used in various applications, including for controlling unmanned systems e.g. drones, robots and other systems. Universal controllers are typically designed to operate with various radio and communication units and use wireless connections to communicate. Universal controllers are typically hand-held but may also be mounted on a structure, for example, on a vehicle.

Conventional universal controllers are ergonomically uncomfortable and are not easy to carry or use. Furthermore, because conventional universal controllers consume a lot of power they can easily get overheated. This can result is discomfort for the user, as well dangerous for the overall universal controller assembly. Furthermore, conventional universal controllers may not provide efficient power management and hot swap ability for batteries. Hot swap ability refers to the changing of power sources like batteries without having to power down or stop using the universal controller. Continuous efforts are being made to develop technology for improving universal controllers.

BRIEF DESCRIPTION OF THE DRAWINGS

The foregoing features and other features will now be described with reference to the drawings of the various aspects of the present disclosure. In the drawings, the same components have the same reference numerals. The illustrated aspects are intended to illustrate, but not to limit the present disclosure. The drawings include the following Figures:

FIG. 2I shows an exploded side view of the controller assembly of FIG. 1A with various electronic components, according to one aspect of the present disclosure;

DETAILED DESCRIPTION

In one aspect, a novel universal controller (may also be referred to herein as a "controller" or "universal controller assembly") having a plurality of components is disclosed. The universal controller includes a housing having a first housing component and a second housing component that are ergonomically shaped to enable a user to comfortably place their hands and access input devices/functions from the controller. The shape of the housing as described below in detail provides space for enabling a comfortable, steady grip and keeps user fingers away from heat producing elements of the controller.

In another aspect, the controller uses equally spaced tabs at the bottom with co-location of connectors and other hardware interface at the top of the controller. This enables the controller to be placed in an upright operational position and allows a user to comfortably use the controller while the user is either sitting or standing.

In yet another aspect, a plurality of heat producing electronic components of the controller are mounted directly to a heat sink such that the heat sink operates both as a structural stiffner and as a heat sink to transfer out internally generated heat from a back-side of the controller, i.e. away from a user. The heat sink is positioned such that when the user is holding the controller, user fingers do not contact any heat producing element. The heat sink fins are also oriented in a manner to enable natural flow of air around the controller, as described below in more detail.

In one aspect, the heat sink of the controller is operationally coupled to a radio module that also generates heat. The manner in which the radio module is mounted creates a natural air channel between the controller and the radio module and allows heat from the radio module to flow up and away from the controller through the heat sink air channels rather than into the housing of the controller. The housing is preferably made of either of a light material like plastic material or other molded or printed materials or a metal, which is thermally isolated from the heat sink such that the controller grips remain at a comfortable temperature in hot environments.

In another aspect, the controller includes a plurality of trigger paddles (e.g. 4) on a top segment of the controller. The trigger paddles are configured to produce an output, e.g. a USB (Universal Serial Bus) output that is proportional to an amount of deflection, as described below. An internal, solid state sensor measures the force when the trigger paddle is pressed. In one aspect, as described below the sensor is mounted to a housing like a cantilevered beam. The sensor measures and reports an electrical signal proportional to an amount of force applied by the trigger onto the sensor via a spring element.

Figure 1A:
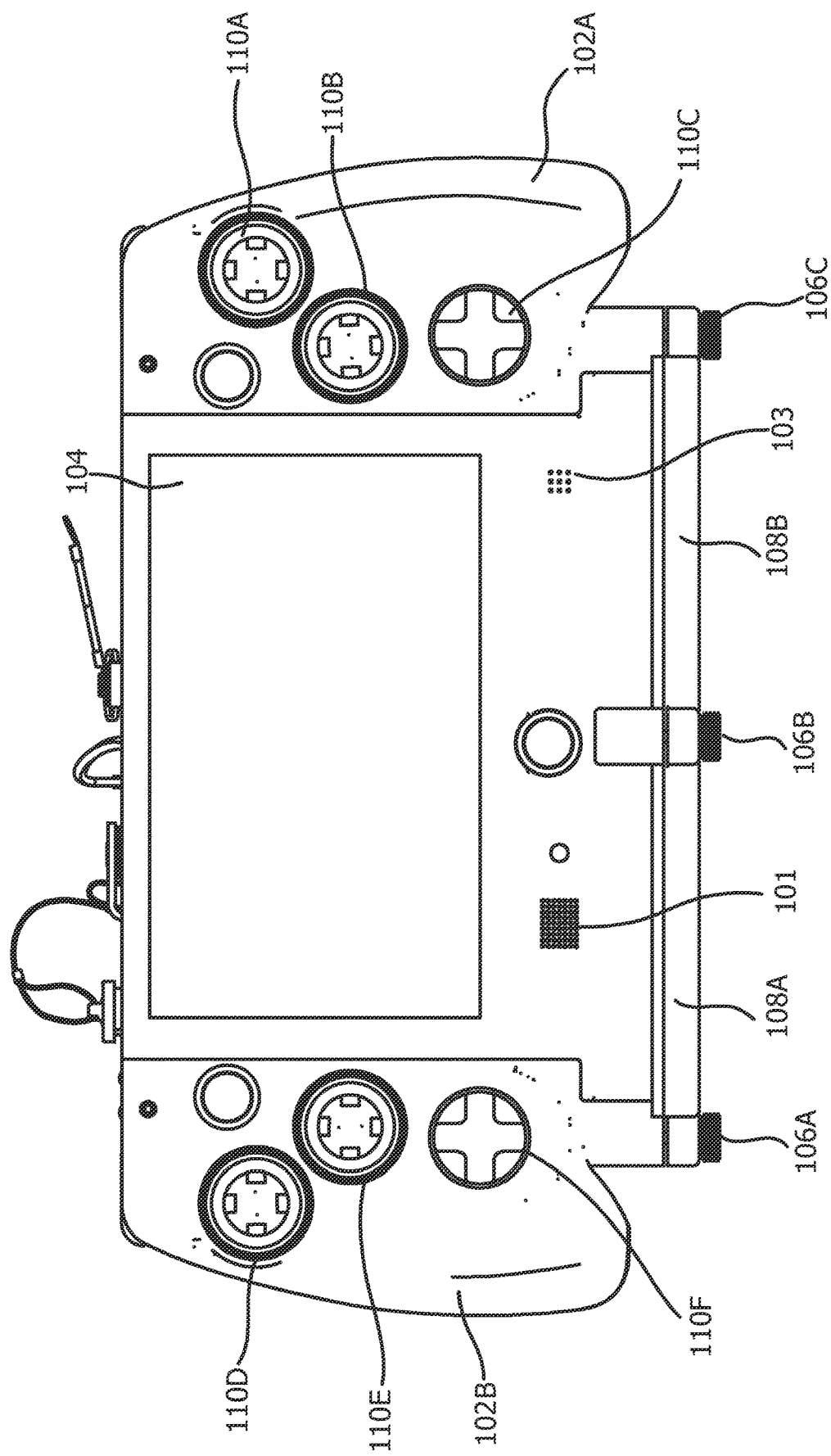
FIG. 1A shows a front view of an assembly of a universal controller (may also be referred to as "controller"), according to one aspect of the present disclosure.

FIG. 1A shows front view of a controller 100 (or controller 100 assembly), according to one aspect of the present disclosure. The controller 100 includes a display screen 104 that displays content to a user. The display screen 104 may be a touch screen for receiving input/output commands from the user. The displayed content will vary based controller use. The display screen size may vary for different controller models, e.g. the display screen may be 5", 7" or any other size. The adaptive aspects of the present disclosure are not limited to any specific display screen size.

Controller 100 includes various input devices 110A-110F (e.g. pads, buttons, joysticks or any other input device) that are easily accessed by the user using the side grips 102A and 102B (also referred to as sides 102A and 102B or curved portions 102A and 102B). It is noteworthy that shape of sides 102A and 102B is curved and contoured in a manner that makes it easier for a user to comfortably hold the controller 100.

In one aspect, controller 100 has equally spaced tabs 106A, 106B and 106C with co-location of various connectors of controller 100 at the top of the unit. This improves the overall stability of the controller and enables the unit to be placed vertically on a flat surface, and a user can comfortably hold the controller using the side grips 102A and 102B.

In another aspect, controller 100 includes one or more speakers 101 to listen to audio output and one or more microphones 103 for receiving voice commands.

In one aspect, controller 100 includes a bottom support component (shown as 108A/108B and may be referred to as bottom support 108) that can receive at least one or more battery packs (may also be referred to as "batteries") for operating controller 100. The location of the battery packs at the bottom of the controller balances the overall weight of the controller. This is especially useful if the controller is dropped. The battery pack location at the bottom reduces user fatigue. Details of placing the battery packs at the bottom are provided below with respect to FIGS. 3A-3B.

Figure 1B:
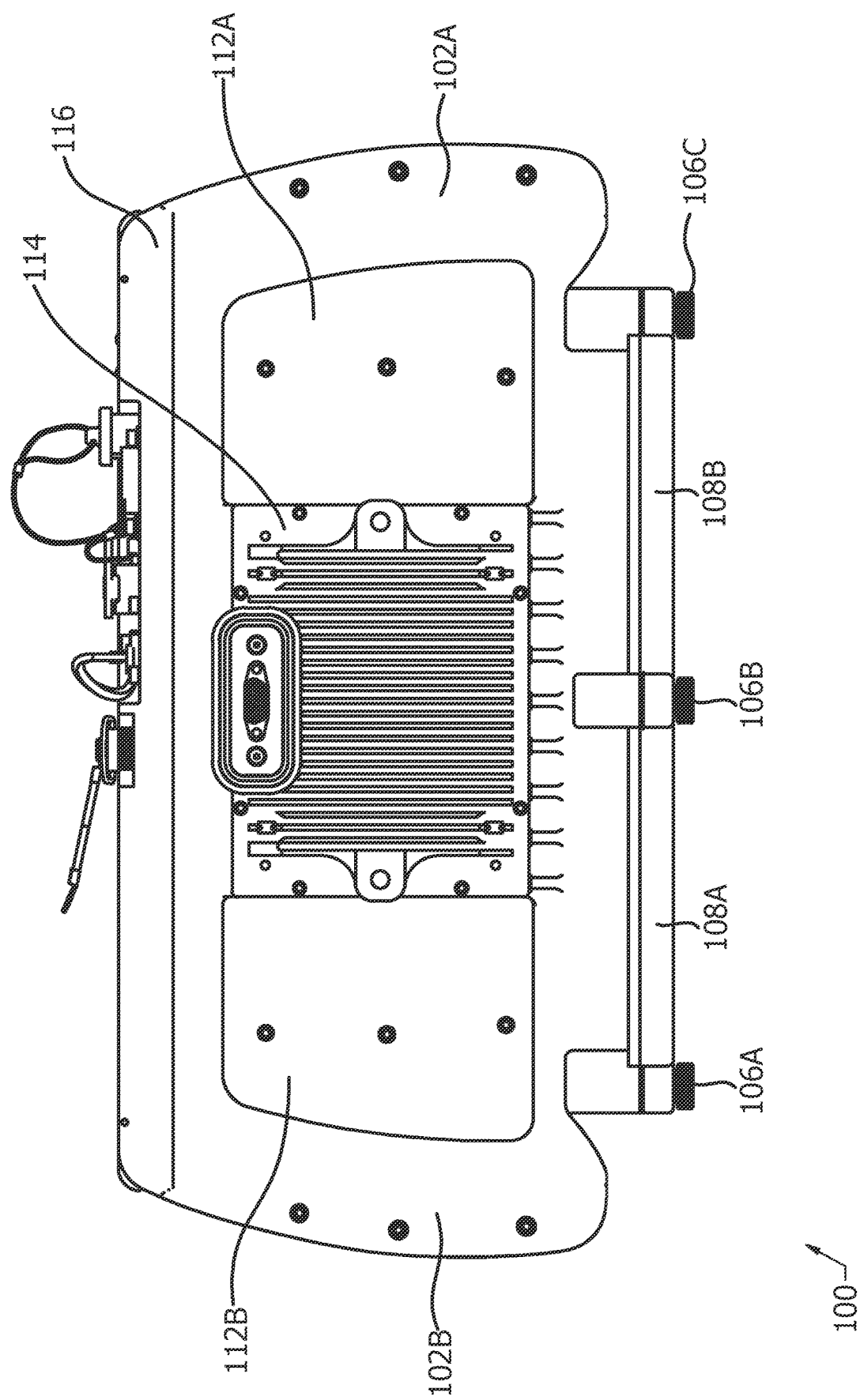
FIG. 1B shows a rear view of the controller of FIG. 1A, according to one aspect of the present disclosure.

FIG. 1B shows a back side of the controller 100 with a flat top segment 116 where numerous connectors are located, as described below in detail. The back side of controller 100 includes indented segments 112A and 112B. A user comfortably grips the curved side portions 102A and 102B and the user fingers can grip the curved portions using the indentation in segments 112A and 112B. It is noteworthy that while the user is holding the controller, the user fingers are separated from the heat sink 114, which prevents exposure to heat from the heat sink and heat generating components of the controller 100.

In one aspect, controller 100 also includes a heat sink 114 that operates both as a structural stiffner and a heat sink, described below in detail with respect to FIGS. 4A-4F.

Figure 1C:
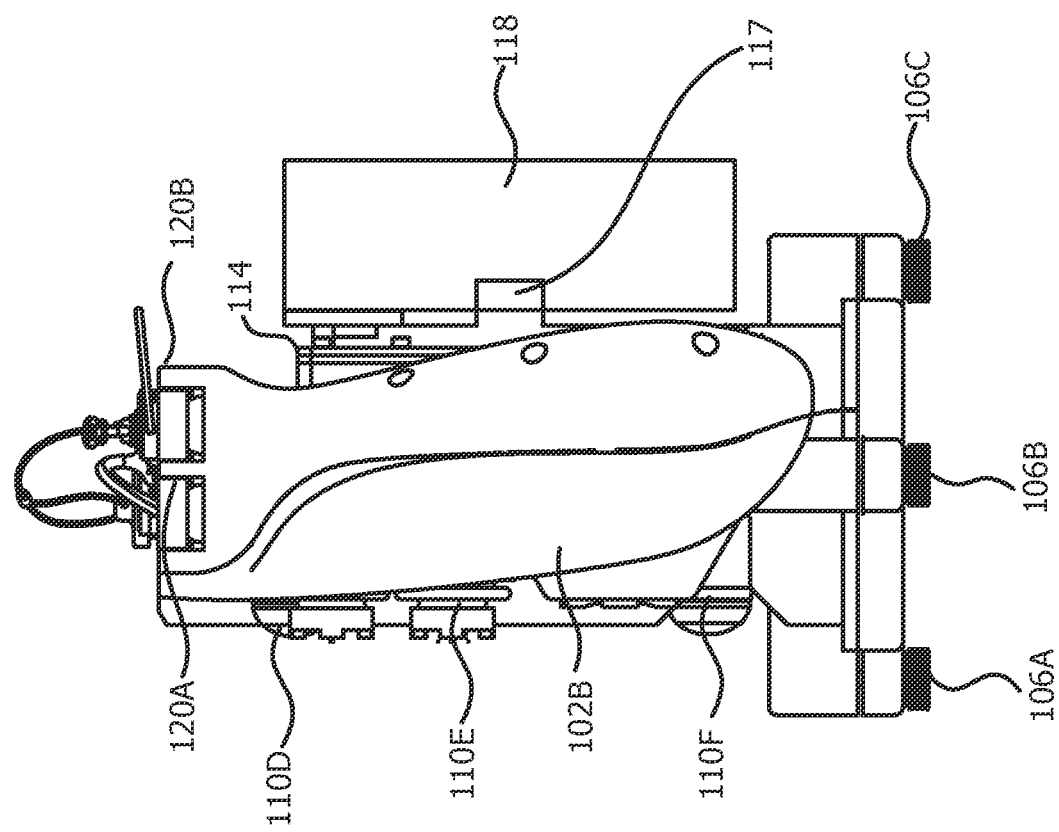
FIG. 1C shows a left-hand side view of the controller of FIG. 1A, according to one aspect of the present disclosure.

FIG. 1C shows a left-hand side view of controller 100, according to one aspect of the present disclosure. FIG. 1C also shows the curved geometry of curved portion 102B, as well as a radio unit 118 connected to the controller 100 but separated from the heat sink 114 by space 117. The radio module 118 placement and connection with the heat sink 114 is such that heat generated from the radio module naturally flows towards the heat sink rather than the user, as described below in detail. FIG. 1C also shows triggers 120A and 120B that are described below in detail with respect to FIGS. 5A-5C.

Figure 1D:
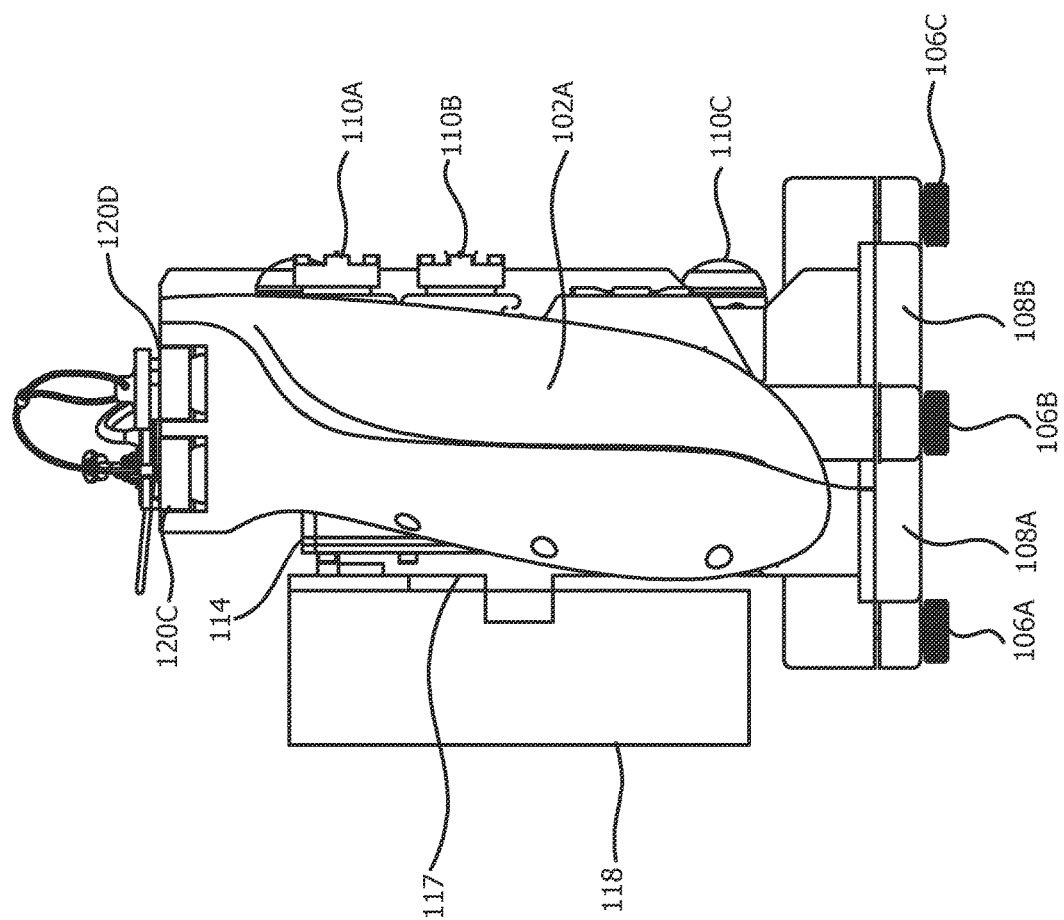
FIG. 1D shows a right-hand side view of the controller of FIG. 1A, according to one aspect of the present disclosure.

FIG. 1D shows a right-hand side view of controller 100. FIG. 1D shows the curved geometry of the curved portion 102A, as well as the radio unit 118 that is separated from the heat sink 114 by space 117. FIG. 1D also shows triggers 120C and 120D that are described below in detail with respect to FIGS. 5A-5C.

Figure 1E:
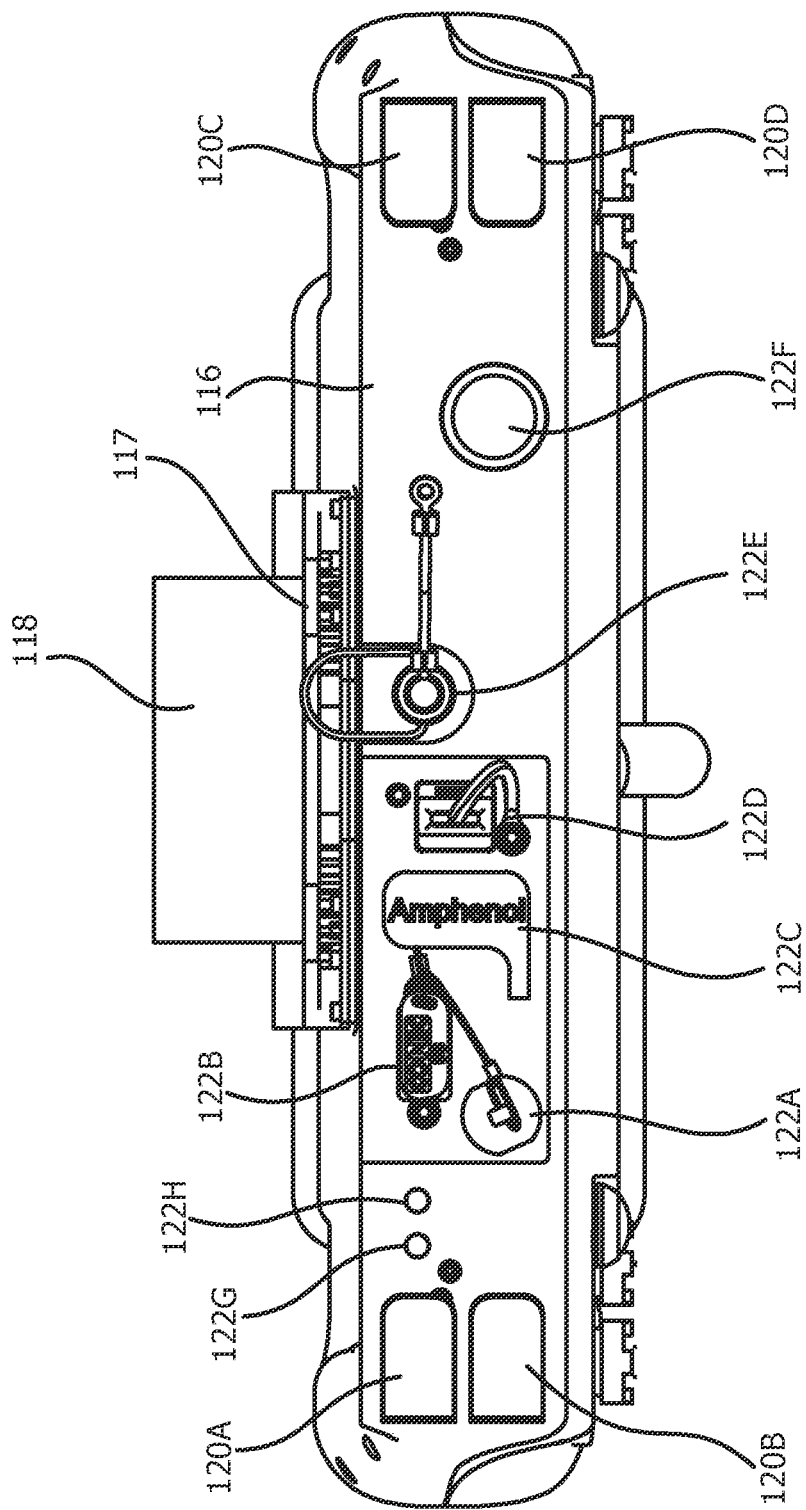
FIG. 1E shows a top view of the controller of FIG. 1A, according to one aspect of the present disclosure.

FIG. 1E shows a top view of the controller 100 with the top flat segment 116, according to one aspect of the present disclosure. The top view shows the top flat segment 116 with proportional trigger paddles 120A-120D that are described below in detail. The top flat segment 116 includes various components, e.g. various connectors 122A-122D, a receptacle 122E for receiving charge from a charging box (not shown), a power on/off button 122F, a LED indicator 122G that shows if a left-hand side battery pack at segment 108A is charged and a LED indicator 122H that provides an indicator of a right-hand side battery pack at segment 108B. Details of battery pack placement are provided below with respect to FIGS. 3A-3B.

Figure 1F:
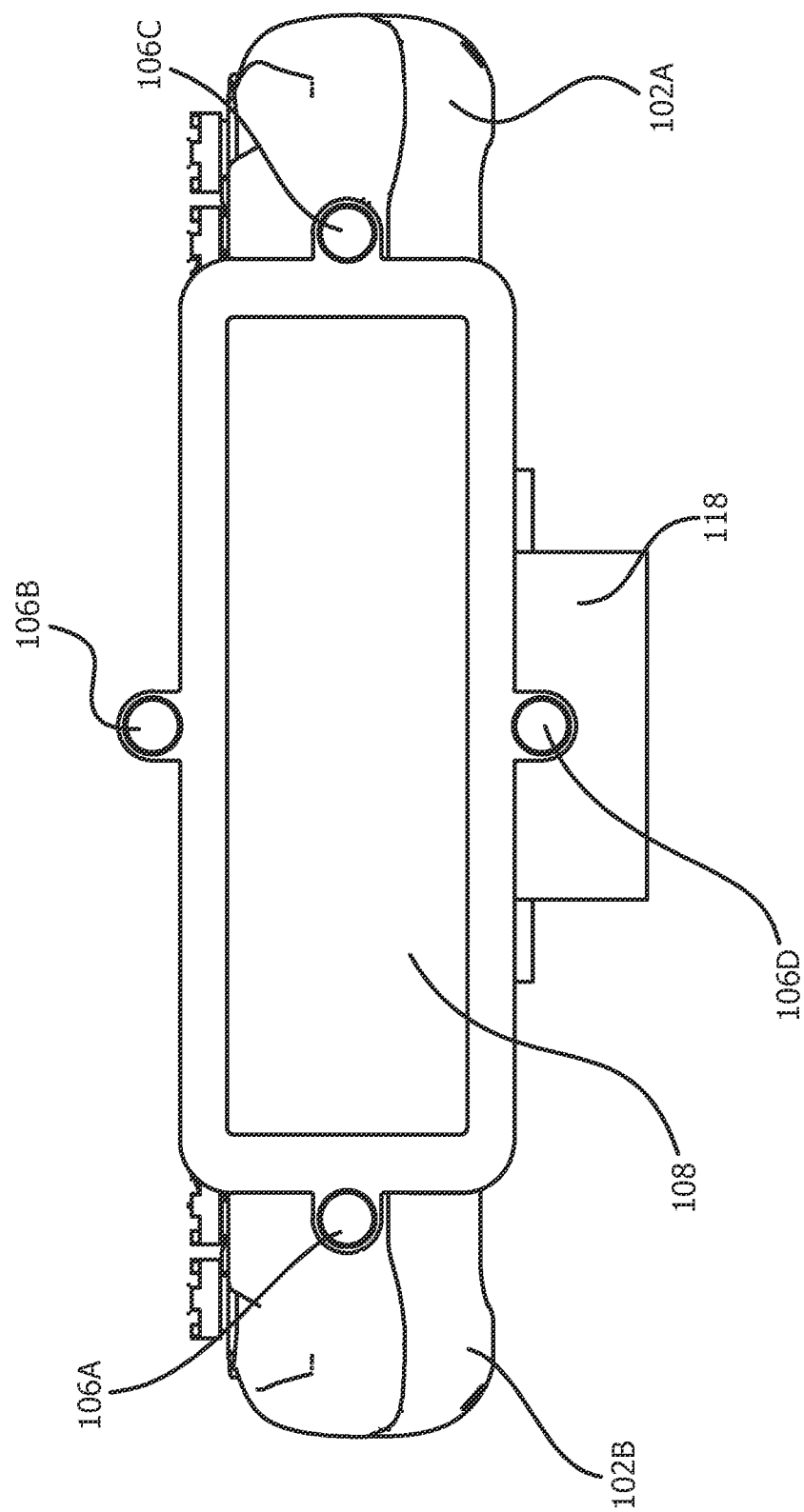
FIG. 1F shows a bottom view of the controller of FIG. 1A, according to one aspect of the present disclosure.

FIG. 1F shows a bottom view of the controller 100, according to one aspect of the present disclosure. FIG. 1F shows bottom support 108 that includes a compartment to receive one or more battery packs for the controller 100.

FIG. 1F also shows the lowest portion of curved portions 102A and 102B and the levelling pads 106A-106D that enable the controller 100 to be safely placed on a flat surface.

Figure 1G:
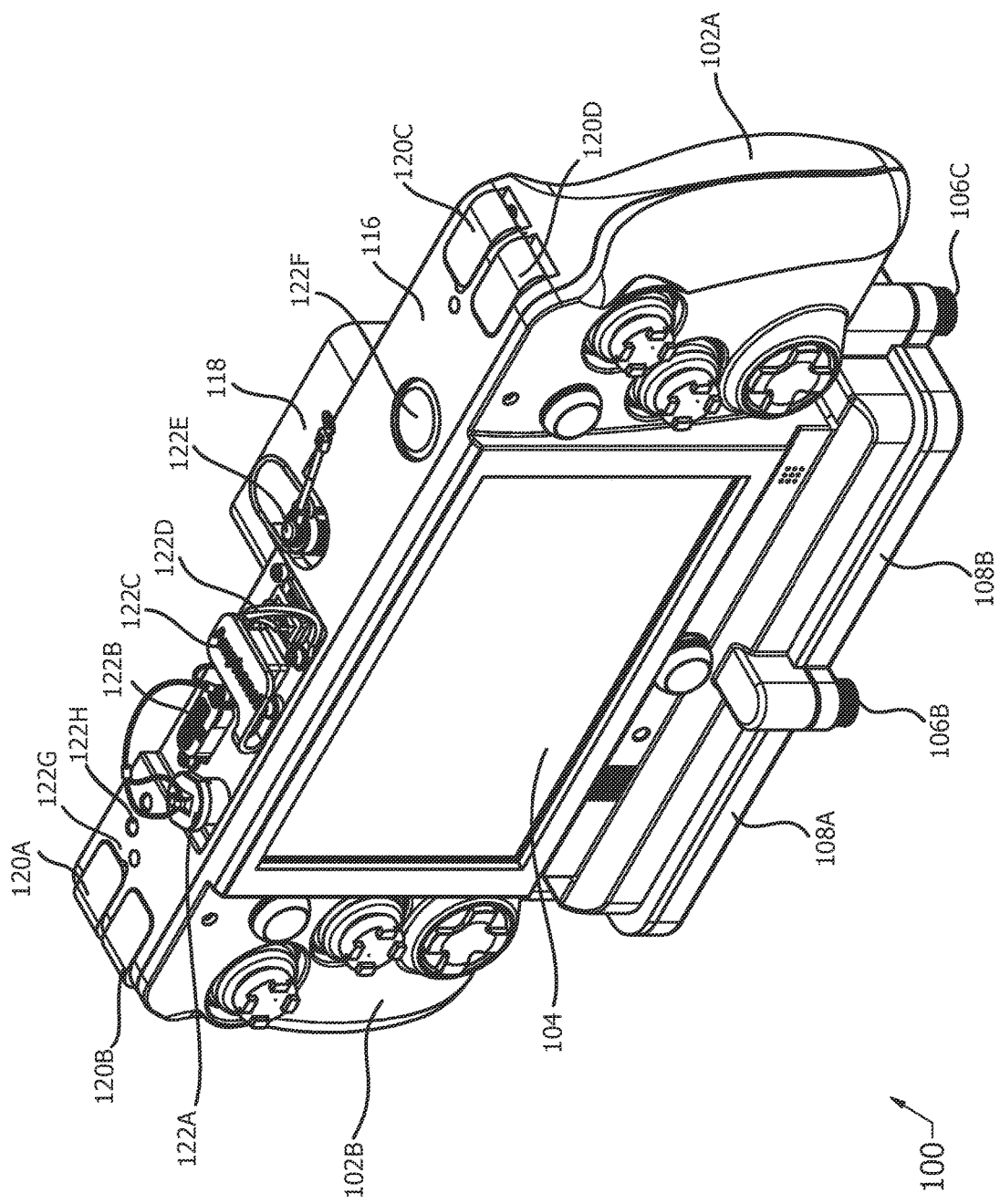
FIG. 1G shows a front isometric view of the controller of FIG. 1A, according to one aspect of the present disclosure.

FIG. 1G shows a front isometric view of controller 100, according to one aspect of the present disclosure. FIG. 1G shows the top flat segment 116 with various connectors and components 122A-122H, the curved portions 102A/102B, the flat levelling pads 106B/106C, the display screen 104 and bottom support 108.

Figure 1H:
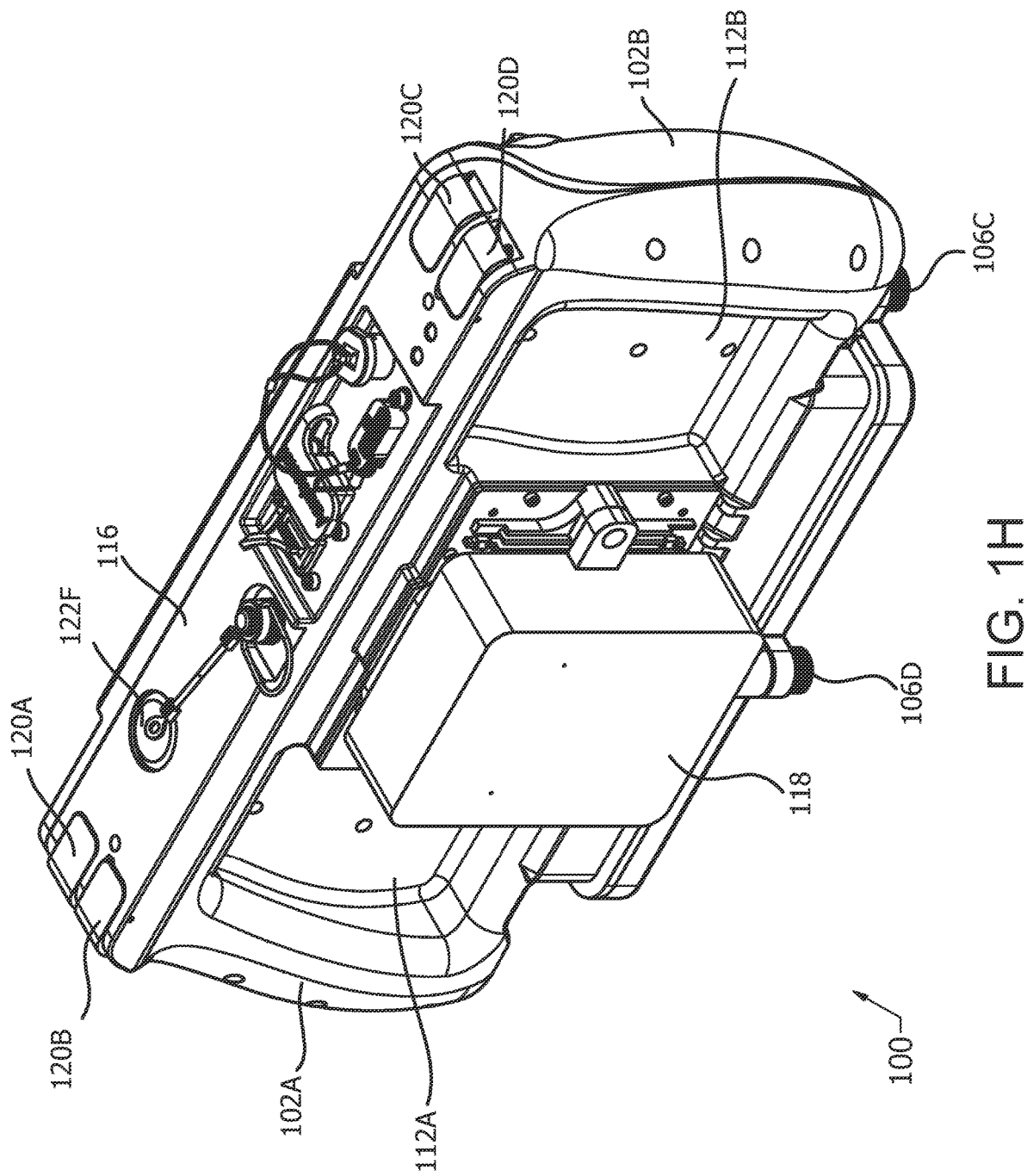
FIG. 1H shows a rear isometric view of the controller of FIG. 1A, according to one aspect of the present disclosure

FIG. 1H shows a backside isometric view of controller 100, according to one aspect of the present disclosure. FIG. 1H shows the depth of the indented segments 112A and 112B that a user can use to grip the unit using portions 102A and 102B. The flat segment 116 with the various connectors and the LED indicators are also shown for clarification.

Figure 2A:
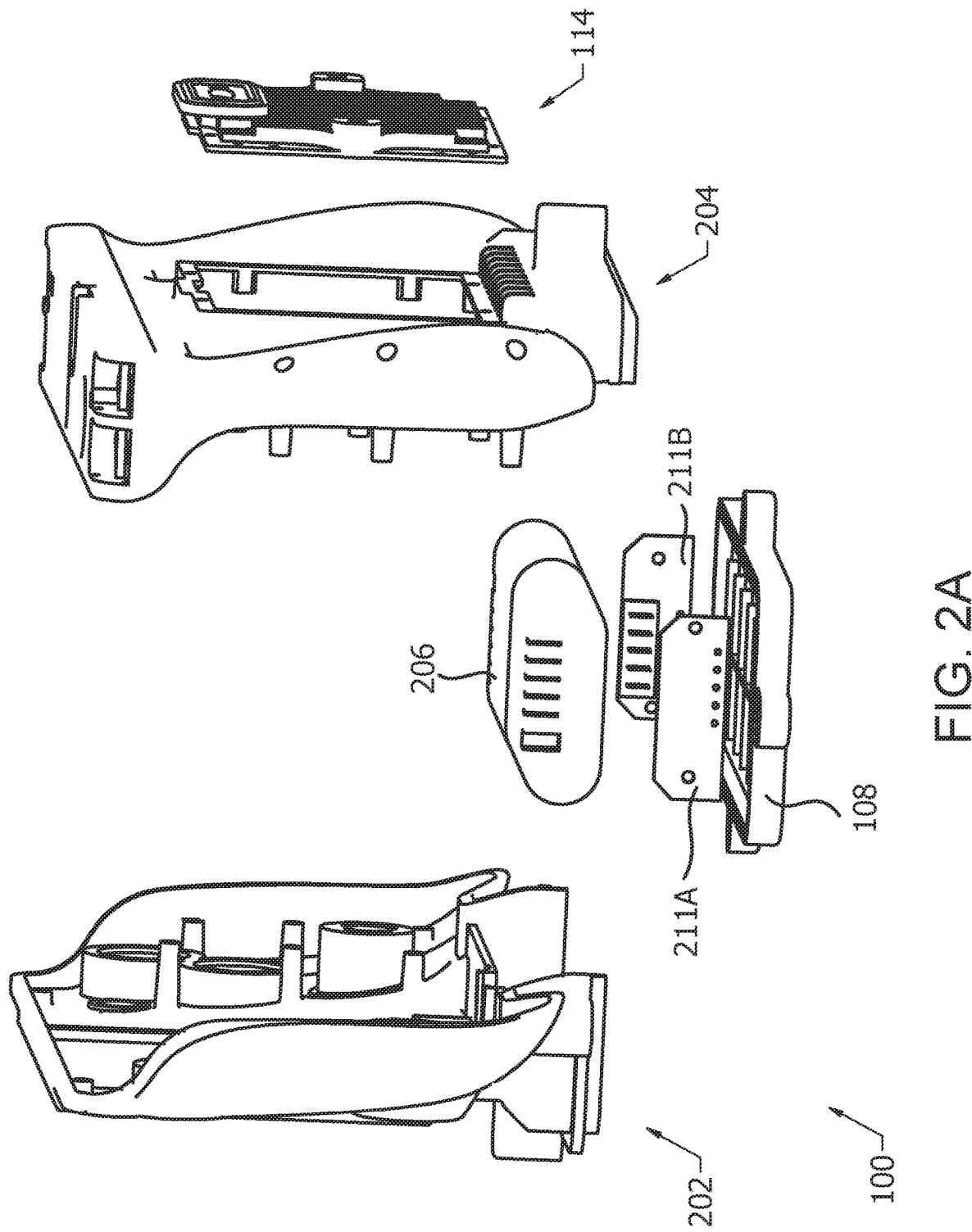
FIG. 2A shows an exploded, isometric view of the controller of FIG. 1A showing various components of the controller assembly, according to one aspect of the present disclosure.

FIG. 2A shows an exploded isometric view of the controller 100 assembly, according to one aspect of the present disclosure. As an example, controller 100 assembly includes a two-clam shell design with a first housing component 202 and a second housing component 202 that are operationally coupled/engaged to produce the main housing of controller 100. The first housing component 202 is also shown in the front view of FIG. 1A, while the second housing component is shown in the back view of FIG. 1B.

In one aspect, the first housing component 202 and second housing component 204 are sealed using a gasket (not shown), which ensures a tight coupling between the two components and makes the controller 100 watertight. In one aspect, the first housing component 202 and the second housing component 204 are manufactured using fiber reinforced nylon with an internal conductive coating to seal the internal compartment from EMI and RFI interference that may impact the overall functionality of if controller 100. It is noteworthy that the adaptive aspects described herein are not limited to any specific housing component materials.

FIG. 2A also shows the bottom support 108 of the controller 100 that receives one or more battery packs 206 (also referred to as battery pack 206A/206B, when two battery packs are used). The battery printed circuit boards (PCBs) 211A and 211B are located on each side of the battery pack 206. The various components of FIG. 2A are described below in detail.

Figure 2B:
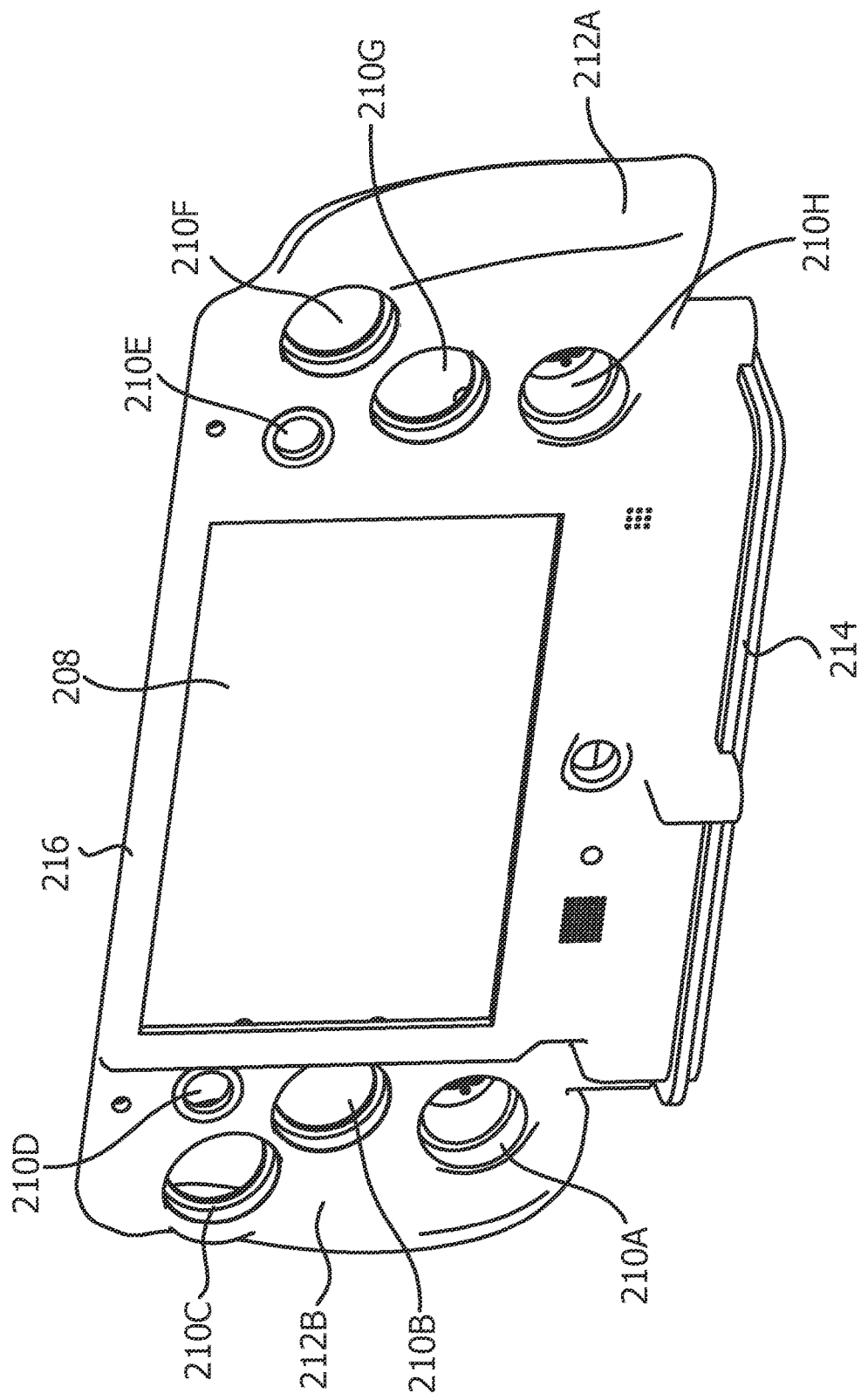
FIG. 2B shows a front view of a first housing component of the controller assembly of FIG. 1A, according to one aspect of the present disclosure.

FIG. 2B shows a front isometric view of the first housing components 202, according to one aspect. The first housing component 202 includes curved portions 212A and 212B that are part of the curved portions 102A and 102B shown in FIG. 1A and described above. The first housing component 202 further includes an opening 208 that may be rectangular in shape to receive the display screen 104 shown in FIG. 1A. The first housing component 202 also includes various openings 210A-210H to receive various knobs and controls for the controller 100 shown as 110A-110F in FIG. 1A. The first housing component 202 has a top flat portion 216 that forms a portion of the top flat segment 116 shown in FIG. 1B and described above. The lower portion 214 sits on top of bottom support 108 for storing battery packs.

Figure 2C:
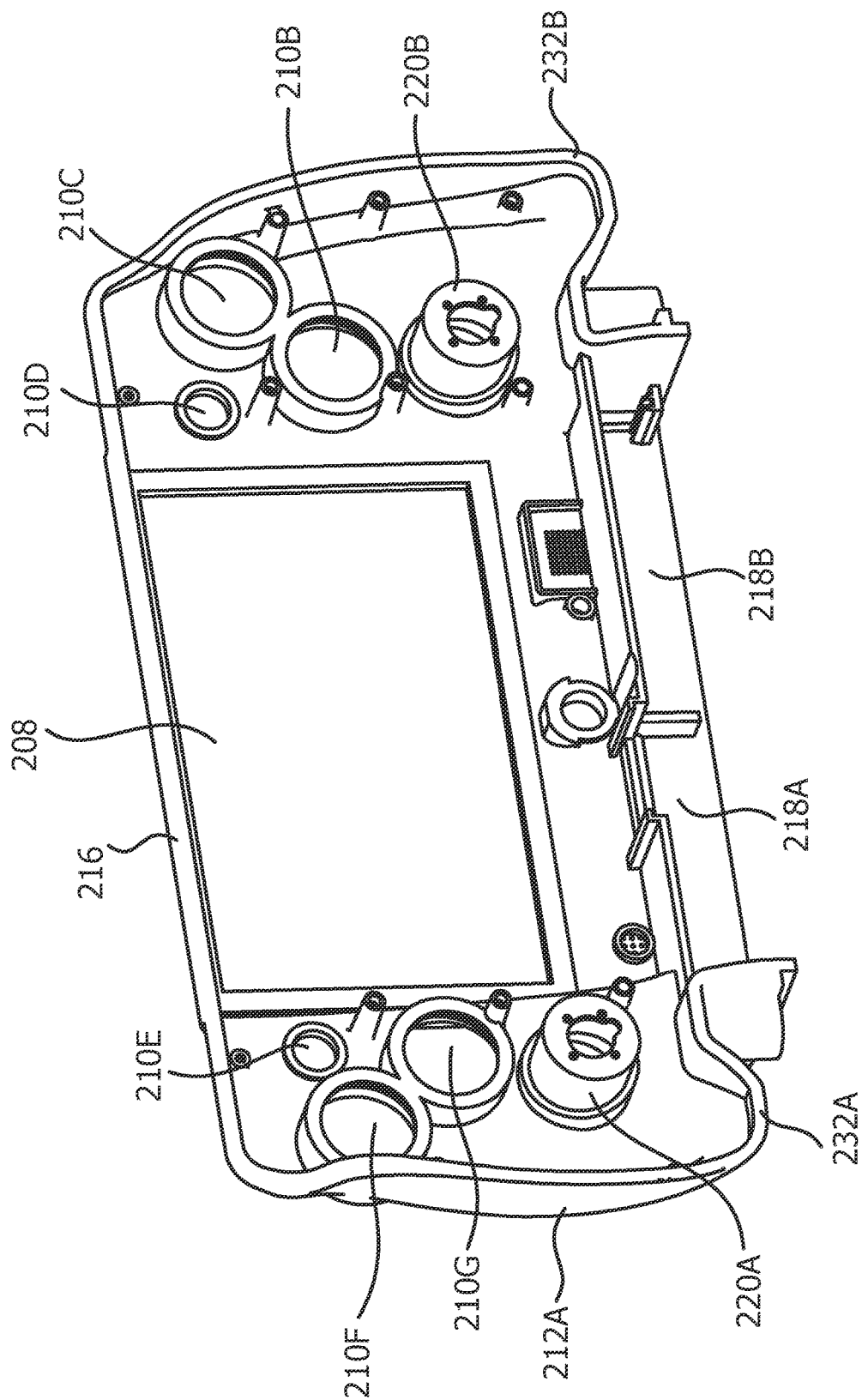
FIG. 2C shows a rear view of the first housing component of FIG. 2B, according to one aspect of the present disclosure.

FIG. 2C shows a rear isometric view of the front housing component 202, according to one aspect of the present disclosure. As an example, FIG. 2C shows input button devices 220A and 220B at openings 210A and 210H shown in FIG. 2B. The cavities 218A/218B are located above the bottom support 108 for placing battery packs 206 at the bottom of the controller 100, described below in detail. The side surface 232A/232B mate with the second housing side surface 232C and 232D, as shown in FIG. 2F and described below.

Figure 2D:
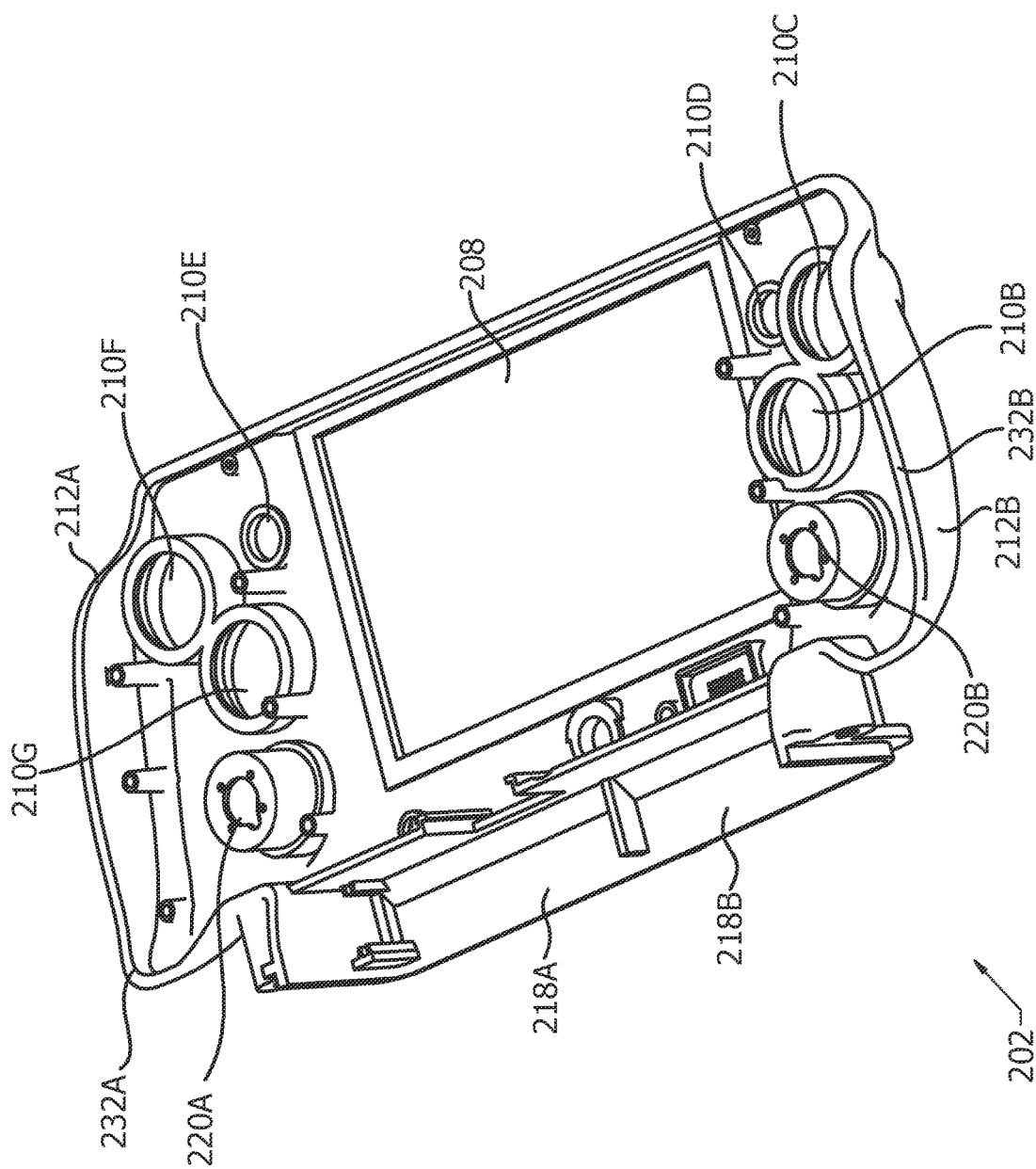
FIG. 2D shows an isometric view of the first housing component of FIG. 2B, according to one aspect of the present disclosure.

FIG. 2D shows another isometric view of the first housing component 202 where the first housing component is laid flat.

Figure 2E:
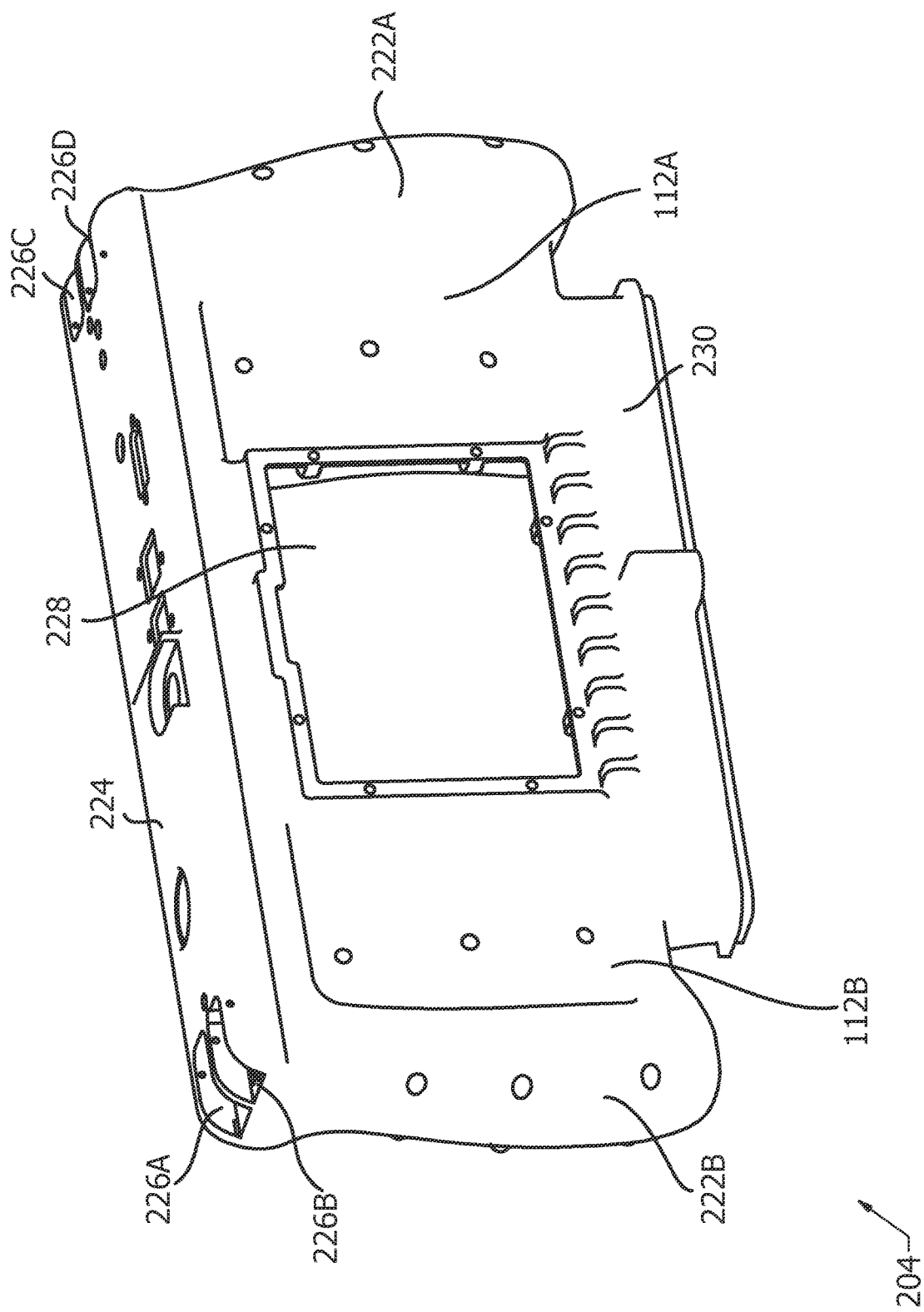
FIG. 2E shows a front view of a second housing component of the controller assembly of FIG. 1A, according to one aspect of the present disclosure.

FIG. 2E shows a front isometric view of the second housing component 204 of the controller 100 assembly, according to one aspect of the present disclosure. The second housing component 204 includes an opening 228 that is used to receive the heat sink 114 shown in FIG. 1B and described below in detail. The second housing component 204 includes curved portions 222A and 222B that mates with curved portions 212A and 212B of the first housing component to form the curved portions 102A and 102B shown in FIG. 1A/1B. The flat segment 224 of the second housing component 204 includes openings 226A-226D to receive the trigger paddles 120A-120D shown in FIG. 1E and described below in detail. Bottom segment 230 mates with the bottom segment 214 of the first housing component 202 to create an opening for securing battery packs 206, as described below.

Figure 2F:
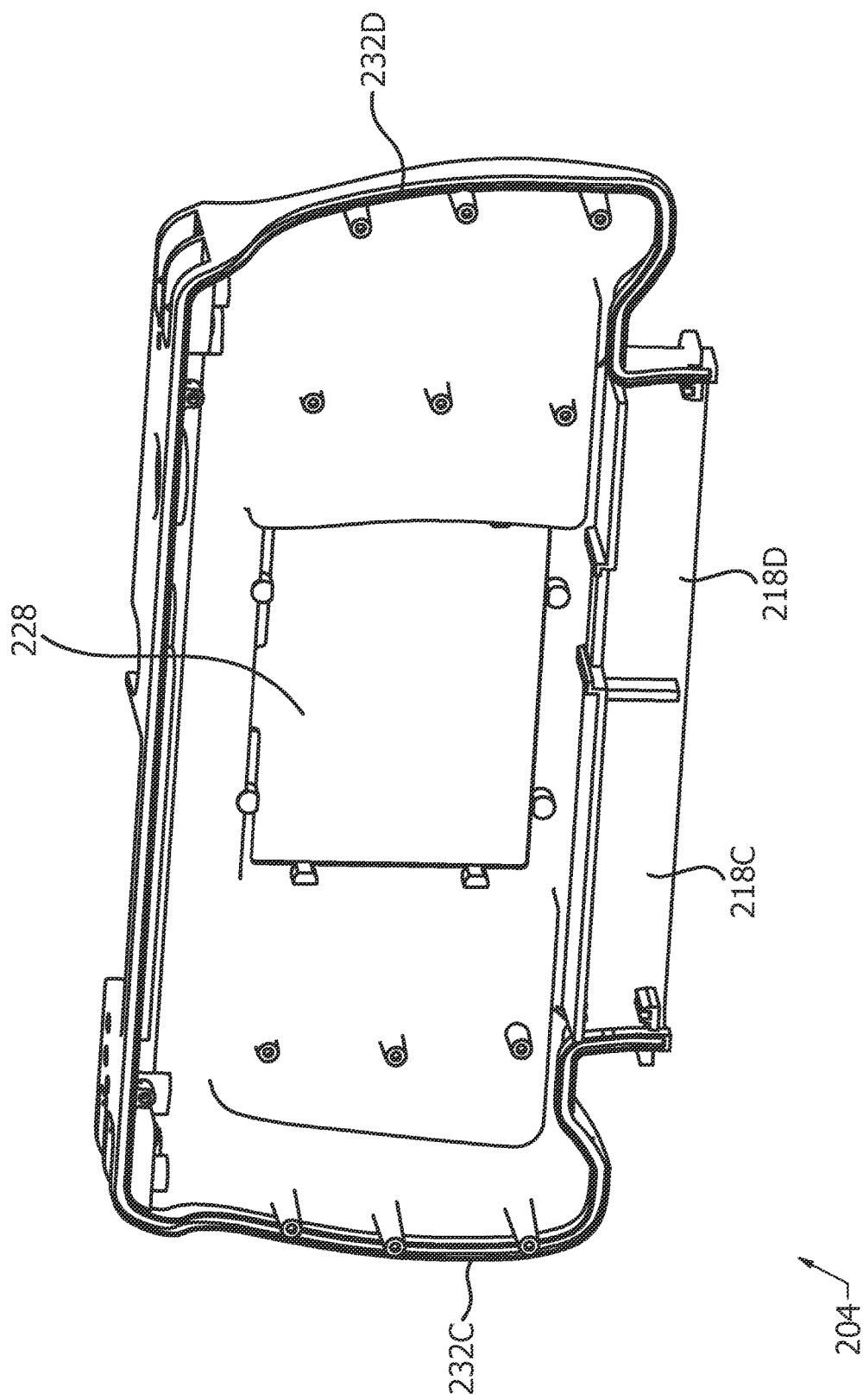
FIG. 2F shows a rear view of the second housing component of FIG. 2E, according to one aspect of the present disclosure.

FIG. 2F shows a rear isometric view of the second housing component that mates with the first housing component 202 of FIG. 2C, according to one aspect of the present disclosure. FIG. 2F shows segments 218C that is aligned with segment 218A (FIG. 2C) of the first housing component 202 and segment 218D that is aligned with segment 218B (FIG. 2C) to create an opening for receiving battery packs 206 of the controller 100 assembly. The side walls of the second housing, namely 232C and 232D are aligned with the side walls of the first housing component 232A and 232B, respectively, as shown in FIG. 2C. The various heat generating components mounted on the heat sink are placed within the space between the first and the second housing components, as described below.

Figure 2G:
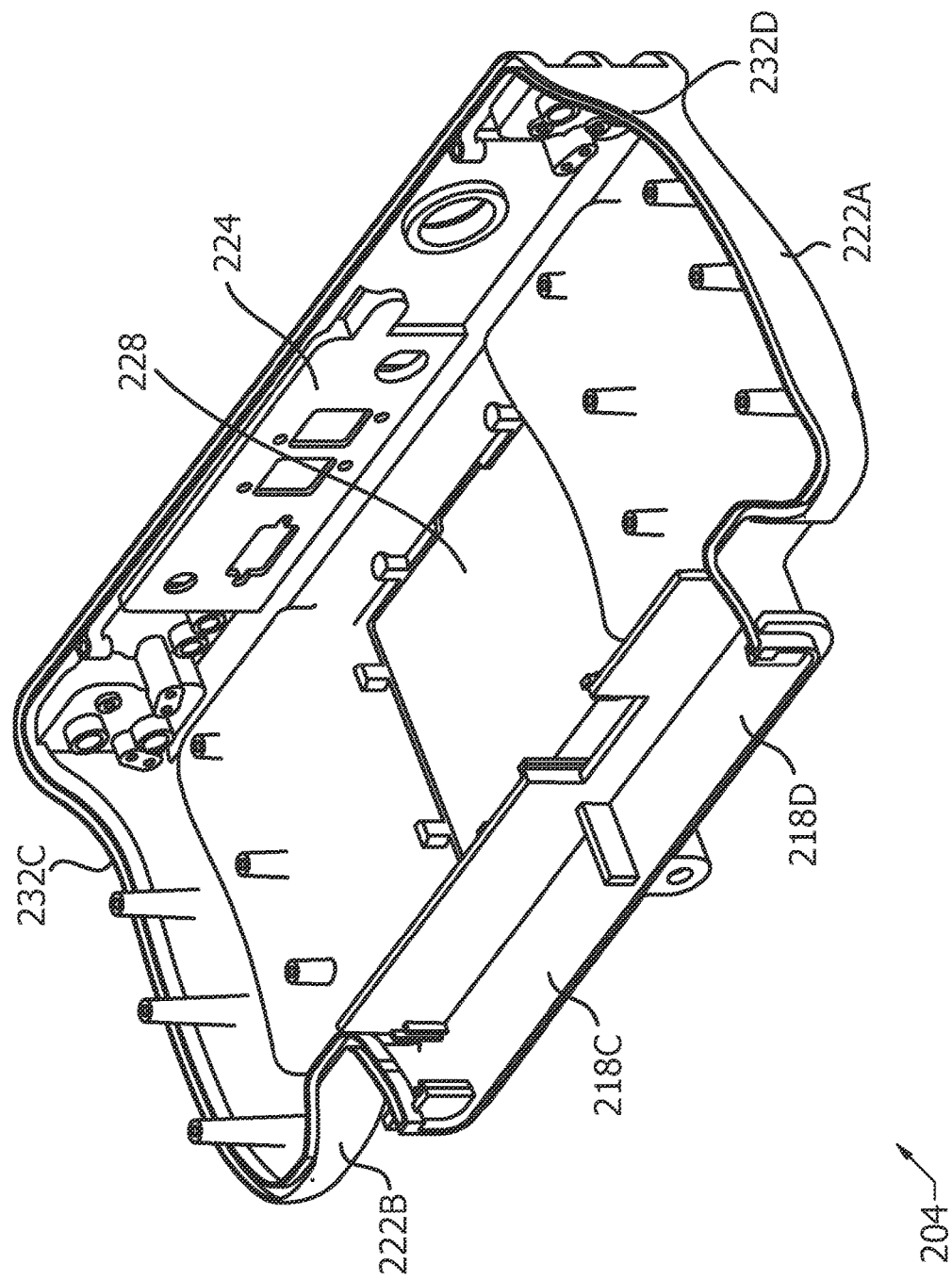
FIG. 2G shows an isometric view of the second housing component of FIG. 2E, according to one aspect of the present disclosure.

FIG. 2G shows another isometric view of the second housing component 204 where the second housing component is laid flat.

Figure 2H:
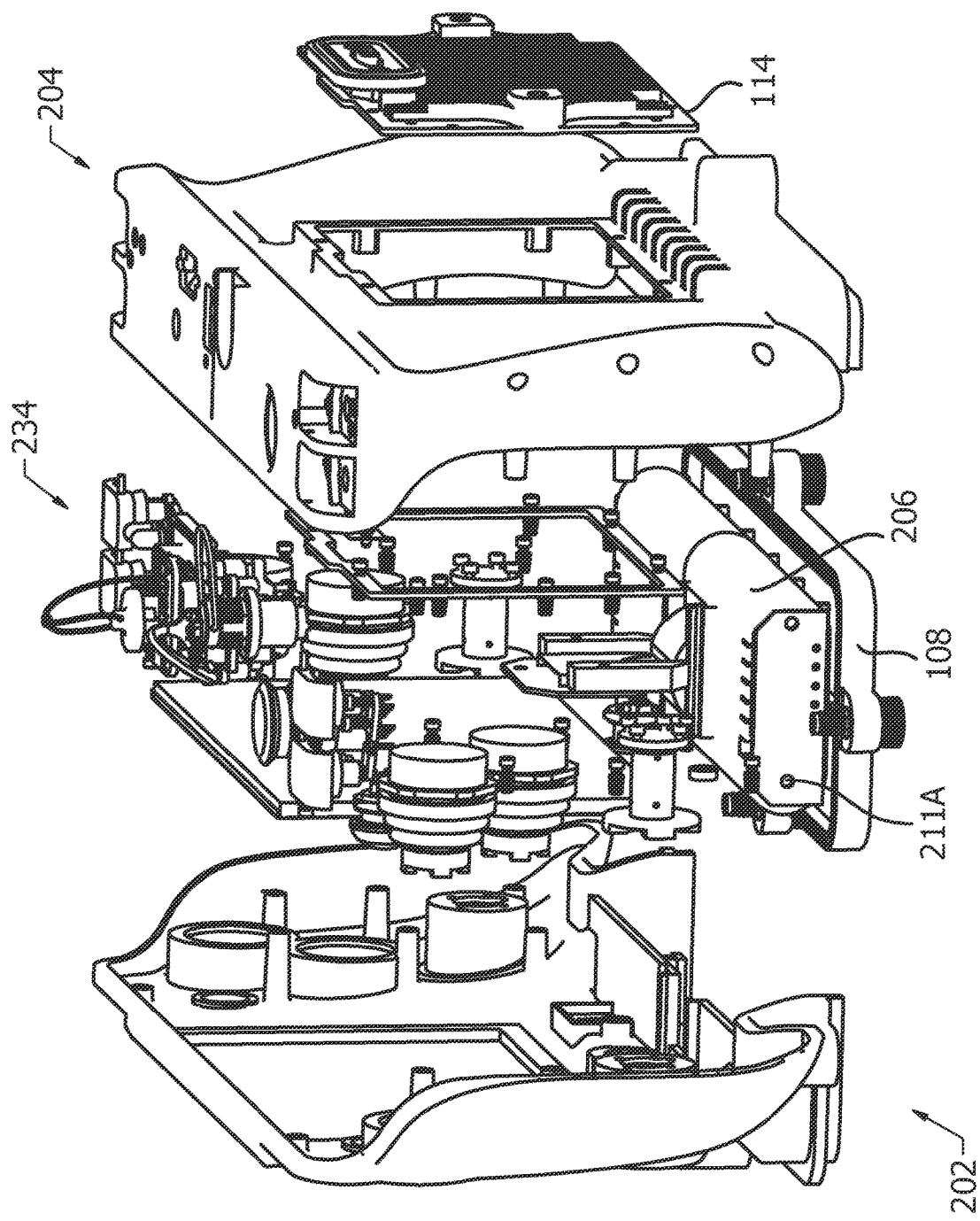
FIG. 2H shows another exploded isometric view of the controller assembly of FIG. 1A with various electronic components, according to one aspect of the present disclosure.

FIG. 2H shows an isometric exploded view of the controller 100 assembly with the first housing component 202, the second housing component 234, the bottom battery support 108, battery packs 206 and various other electromechanical components, shown jointly as 234. The various components 234 include the various electronics components used by controller 100.

FIG. 2I shows a side-exploded, view of controller 100 with the electronics 234 between the first and second housing components 202 and 204 described above.

Figure 3A:
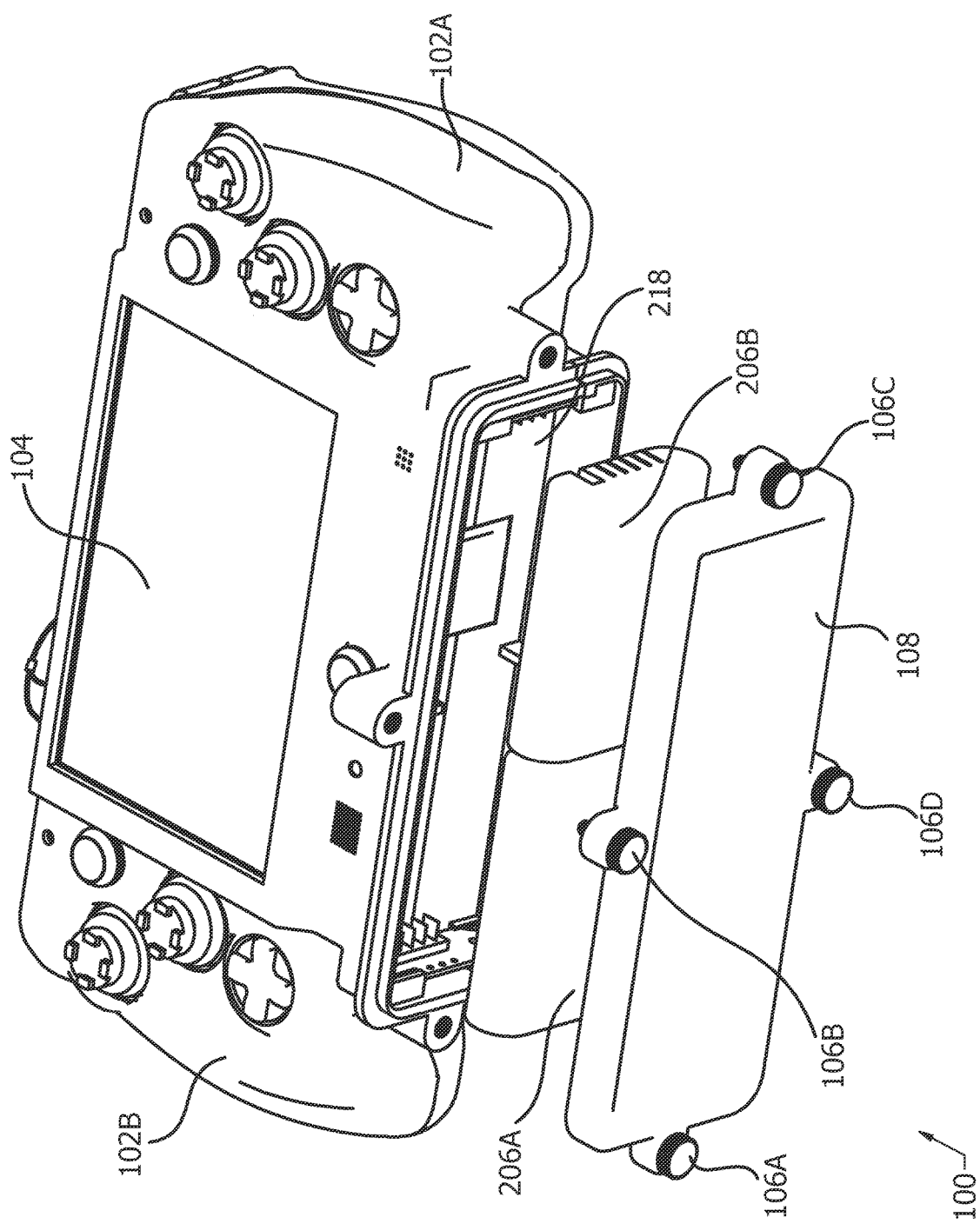
FIG. 3A shows an exploded view of the controller assembly of FIG. 1A with a bottom support for carrying battery packs, according to one aspect of the present disclosure.

FIG. 3A shows an exploded view for placing two battery packs 206A/206B within the opening 218 created by the first and second housing components 202 and 204 of the controller 100 assembly, described above. The levelling pads 106A-106D enable the controller 100 assembly to be placed in an upright vertical orientation.

Figure 3B:
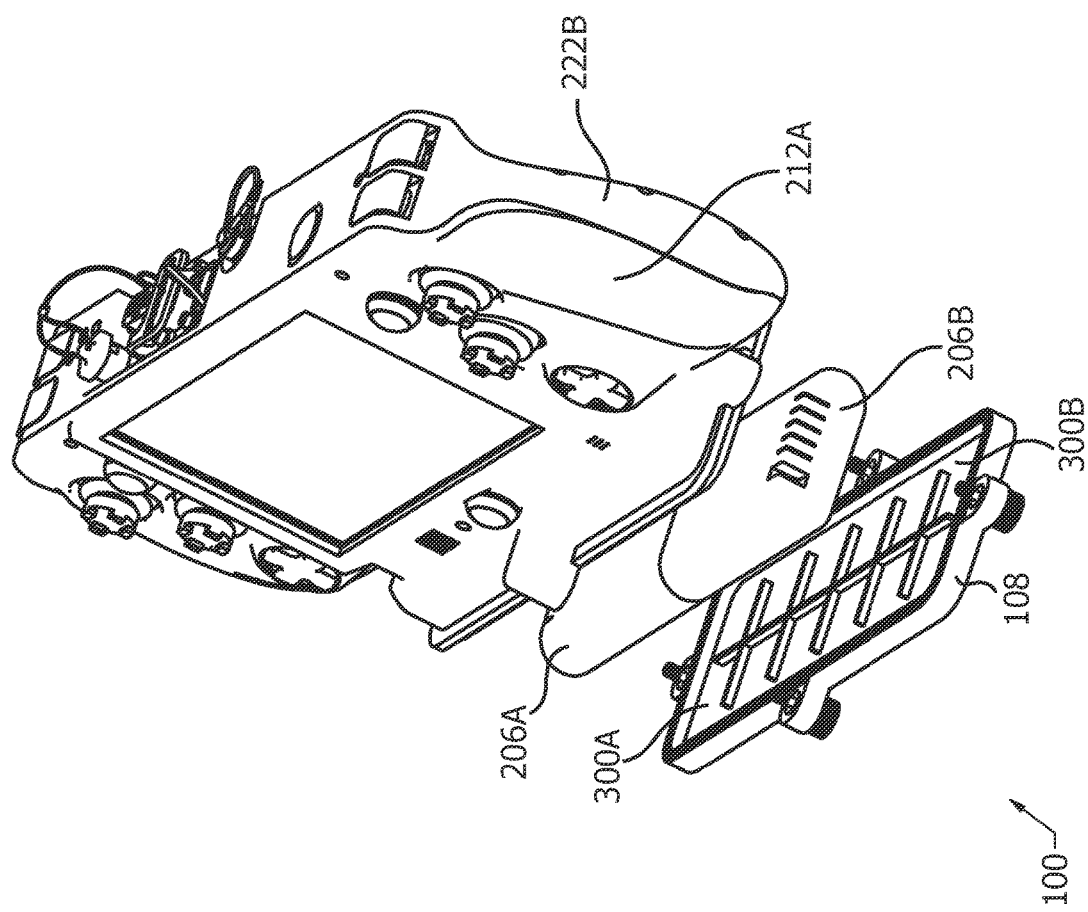
FIG. 3B shows another exploded view of the controller assembly of FIG. 1A with a bottom support for carrying battery packs, according to one aspect of the present disclosure.

FIG. 3B shows another exploded view with details of the bottom support 108. In one aspect, the bottom support 108 includes cavity 300A/300B to receive battery packs 206A and 206B. It is noteworthy that by locating the battery packs 206A/206B at the bottom of the controller 100 provides balance the overall unit in the event the controller is dropped. The location of the battery packs at the bottom also reduces operator fatigue.

Figure 4A:
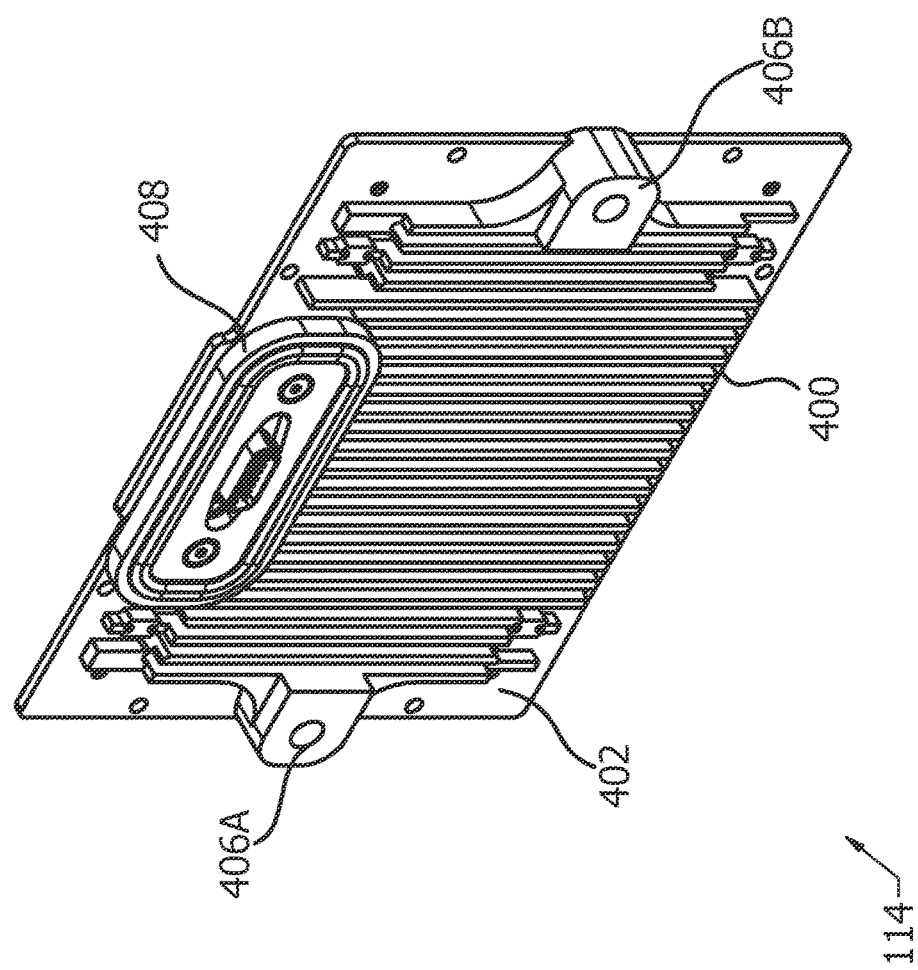
FIG. 4A shows a front isometric view of a heat sink used by the controller assembly of FIG. 1A, according to one aspect of the present disclosure.

FIGS. 4A-4F show the innovative heat transfer and thermal management system for the controller 100 assembly, according to one aspect of the present disclosure. FIG. 4A shows a front-isometric view of the heat sink 114 with a plurality of fins 400 on surface 402, according to one aspect of the present disclosure. Heat sink 114 is coupled to a radio connector 408 that connects to the radio unit 118 (see FIG. 1C). The radio unit 118 is mounted using segments 406A and 406B.

Figure 4B:
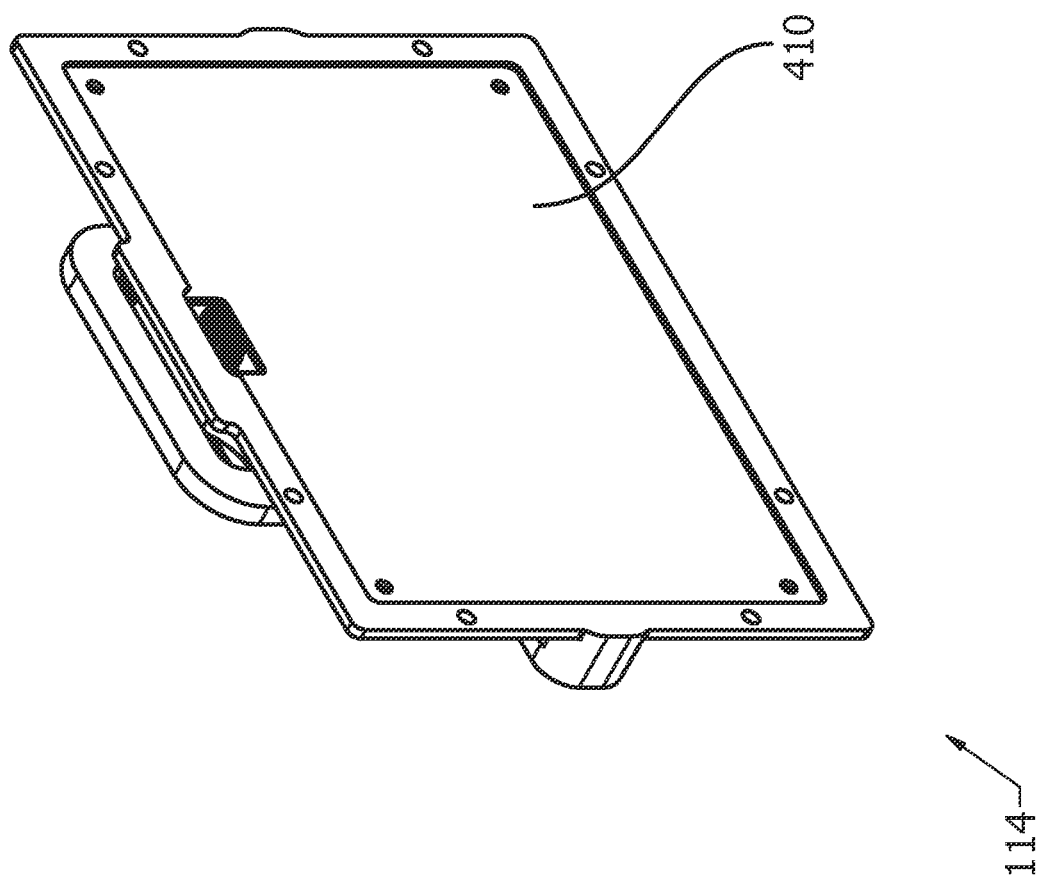
FIG. 4B shows a rear isometric view of a heat sink of the controller assembly of FIG. 1A, according to one aspect of the present disclosure.
Figure 4C:
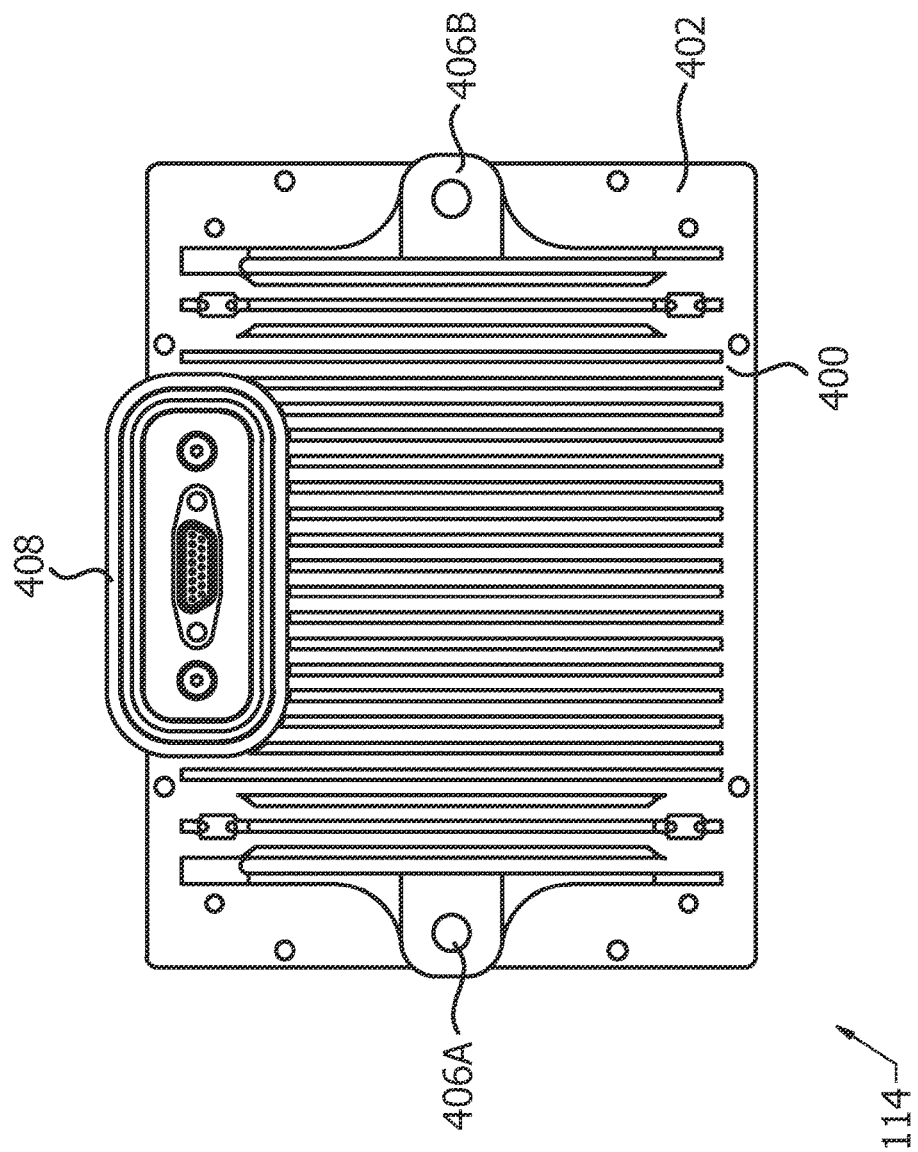
FIG. 4C shows a front view of a heat sink of the controller assembly of FIG. 1A, according to one aspect of the present disclosure.

FIG. 4B shows a rear-isometric view of the heat sink 114 with a flat surface 410 that is used for mounting one or more heat generating components of the controller 100. FIG. 4C shows a two-dimensional front view of the heat sink 114.

Figure 4D:
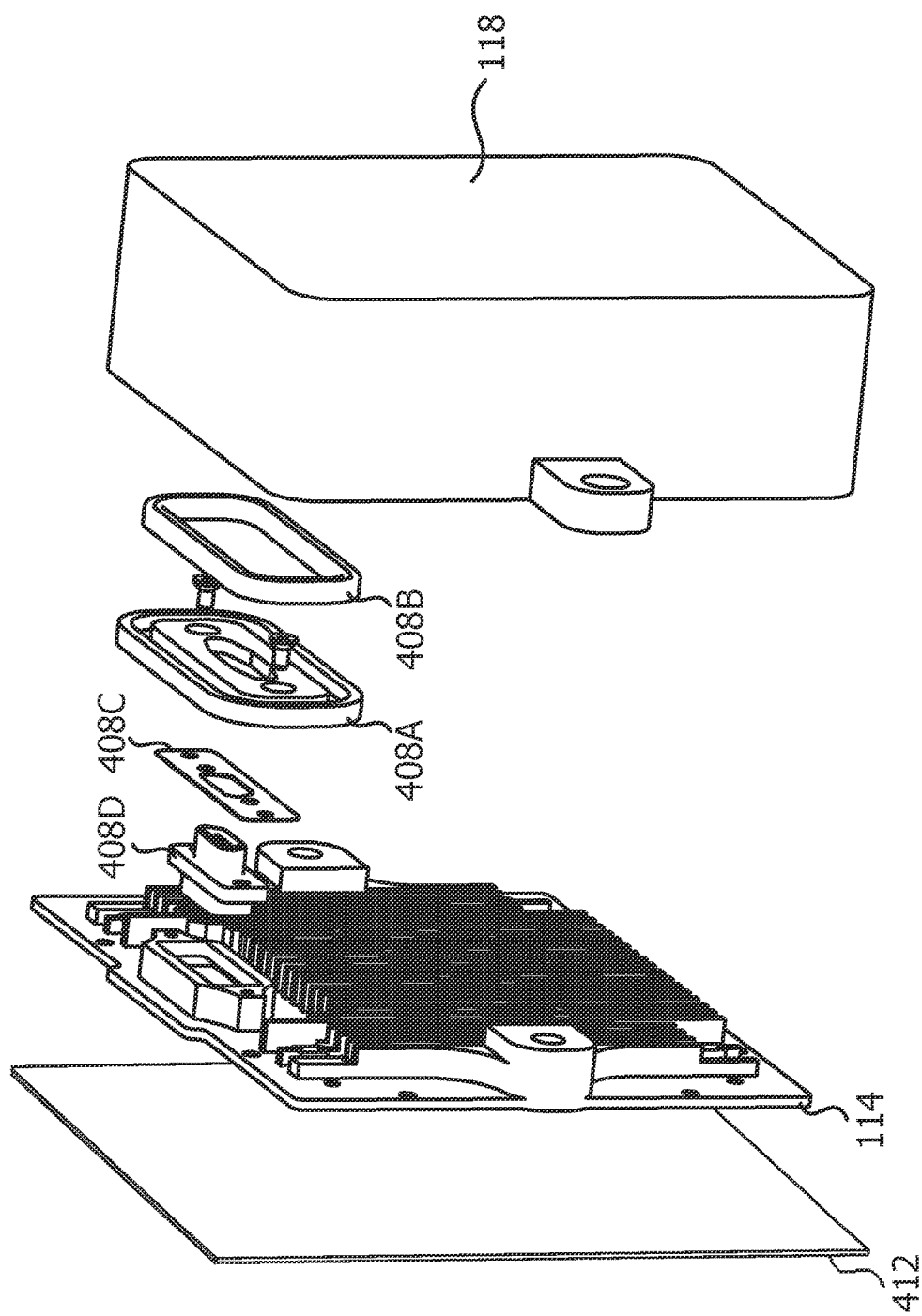
FIG. 4D shows an exploded view of using a heat sink by the controller assembly of FIG. 1A, according to one aspect of the present disclosure.

FIG. 4D shows an exploded view of coupling the heat sink 114 using the various components of the radio connector 408 (shown as 408A-408D) to radio module 118, according to one aspect of the present disclosure. A PCB 412 is connected to the rear flat surface 410 (shown in FIG. 4B) of heat sink 114. The PCB 412 is used to support one or more electronic components.

Figure 4E:
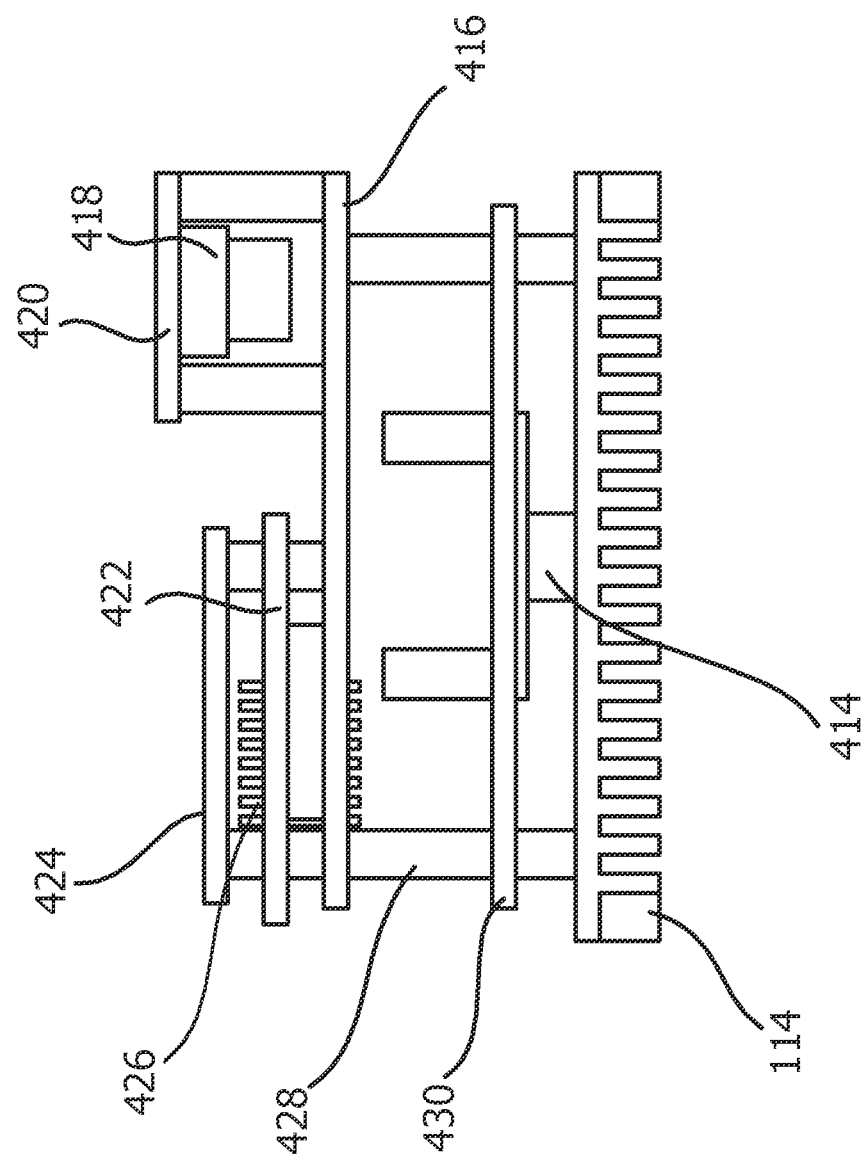
FIG. 4E shows a cross-sectional view of the controller assembly of FIG. 1A with a heat sink, according to one aspect of the present disclosure.
Figure 7A:
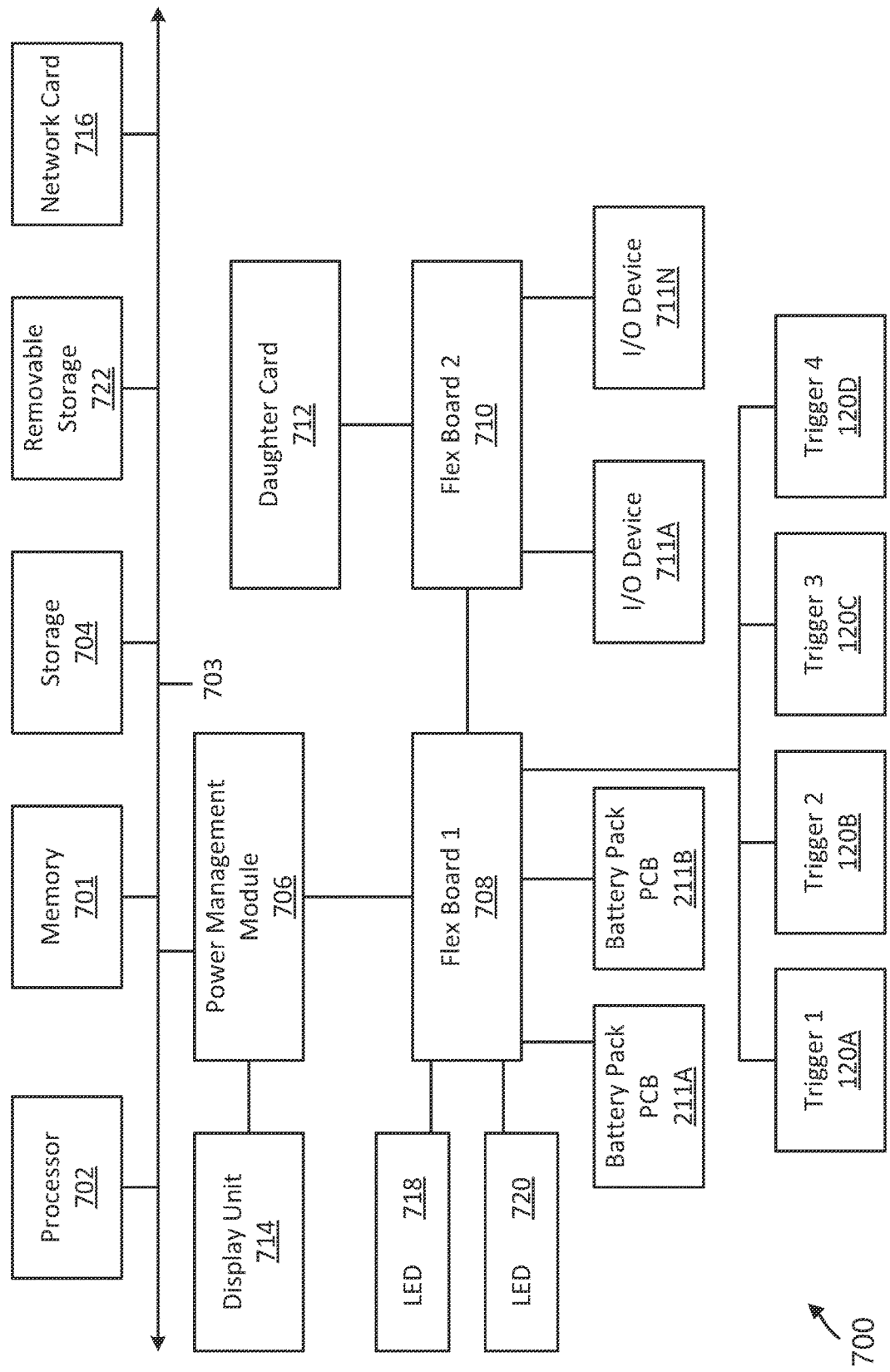
FIG. 7A is a block diagram of an example of the electronics used in the controller assembly of FIG. 1A.

FIG. 4E shows a cross-sectional view with examples of various electronic components that are mounted on heat sink 114, according to one aspect of the present disclosure. As an example, heat sink 114 is connected to a processor heat sink 414 that is mounted on a computer PCB 430. The computer PCB 430 carries the processor related electronics. A spacer 428 separates the computer PCB 430 and a carrier PCB and LED video PCB (shown as 416). A PCB 426, a power management PCB 424, a joystick controller 422, a flash drive PCB 420 and holder 418 are other heat generating components that are coupled to heat sink 114 as shown in FIG. 4E. The adaptive aspects of the present disclosure are not limited to any specific number of PCBs or components of FIG. 4E. Details of the various electronic components are shown in FIG. 7A and described below in detail.

Figure 4F:
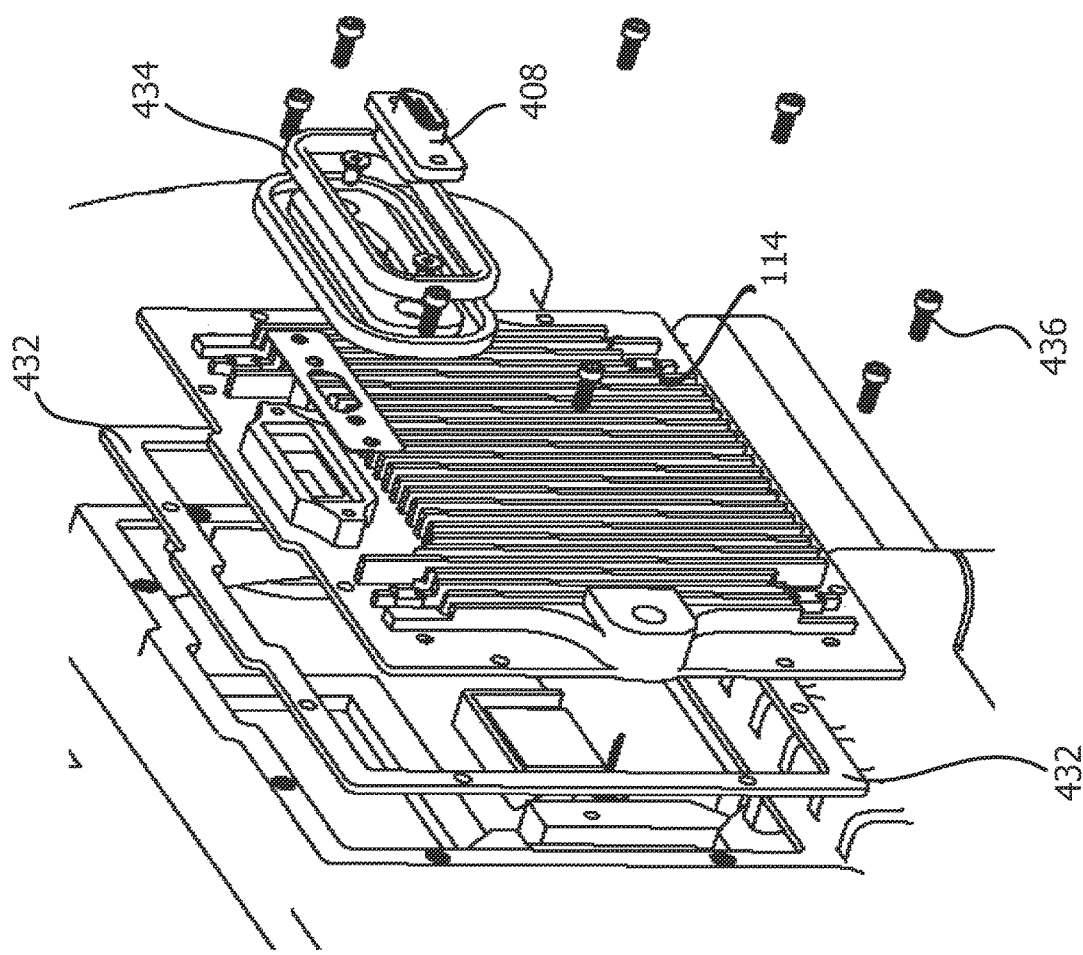
FIG. 4F shows an exploded view for installing a heat sink in the controller assembly of FIG. 1A, according to one aspect of the present disclosure.

FIG. 4F shows a partial rear isometric view of the controller 100 to install the heat sink 114 onto the second housing component 204. A heat sink gasket 432 is placed between the heat sink 114 and the various electronic components shown in FIG. 4E. The installation using the components (e.g. gasket 435, connectors 408, EMI shielding 434 and screws 436) of FIG. 4F is self-explanatory.

In one aspect, a plurality of heat producing electronic components of the controller are mounted directly to the heat sink 114 such that the heat sink operates as a structural stiffner for the controller 100 and internally generated heat is transferred out from the rear of the controller, i.e. away from a user. The heat sink is positioned such that when the user is holding the controller using curved portions (or grips) 102A/102B, the fingers do not make contact with any heat transfer element. The heat sink fins 400 are oriented in a manner to enable natural flow of air around the controller 100.

In one aspect, the heat sink 114 is operationally coupled to the radio module 118 that also generates heat. The manner in which the radio module 118 is mounted using connector 408 creates a natural air channel between the controller 100 and the radio module 118 and allows heat from the radio module 118 to flow into the heat sink 114 rather than the housing of the controller 100. Since the housing is preferably made of a plastic material and is thermally isolated from the heat sink, the controller grips 102A/102B remain at a comfortable temperature in hot environments.

Figure 5A:
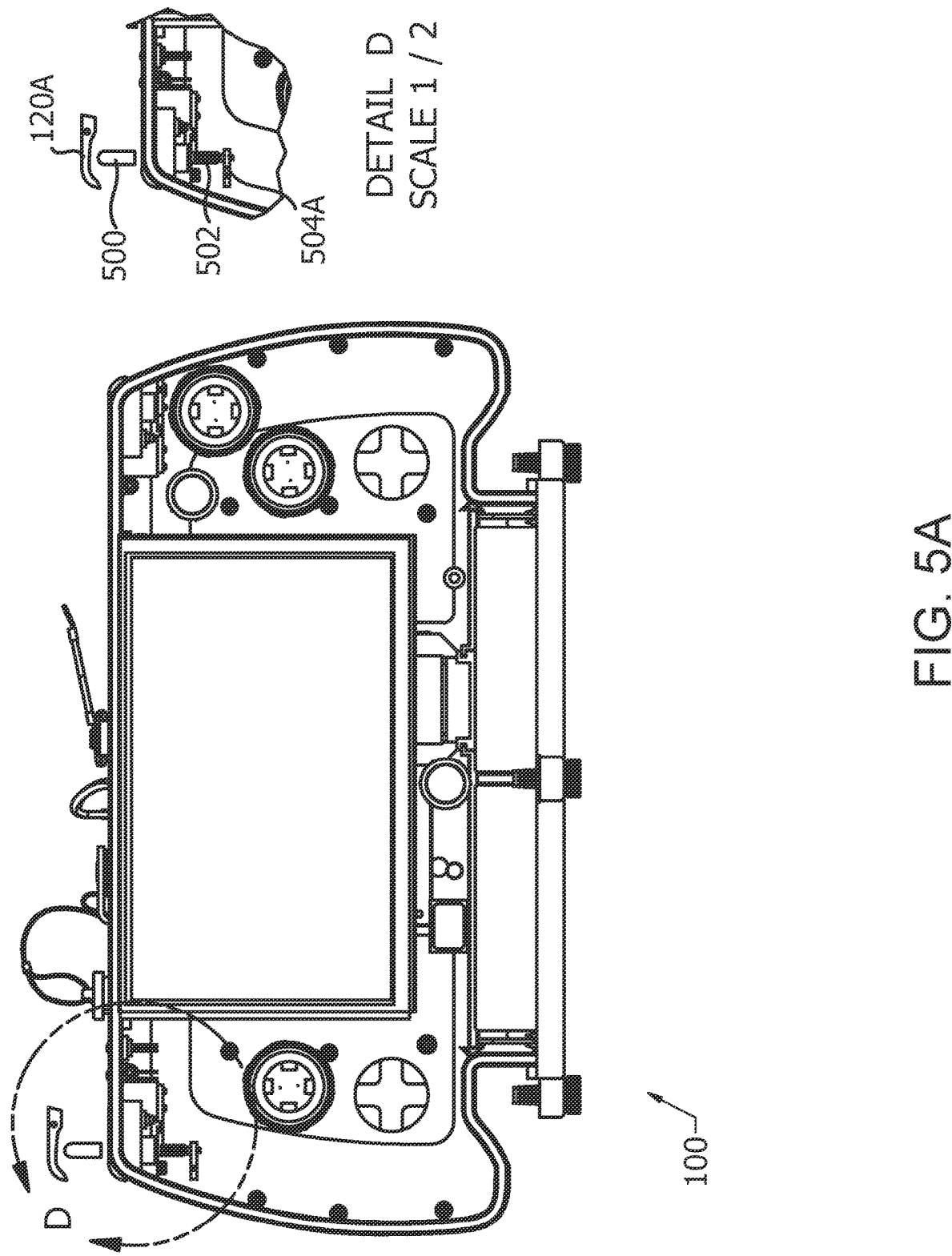
FIG. 5A shows a sectional view of the top left-hand side of the controller assembly of FIG. 1A illustrating a trigger mechanism, according to one aspect of the present disclosure.
Figure 5B:
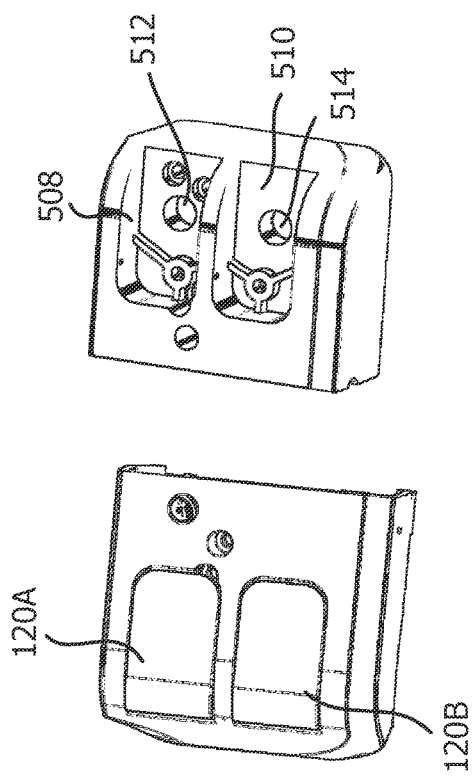
FIG. 5B provides an example of trigger paddles used in the controller assembly of FIG. 1A and details of a cavity in the housing of the controller assembly for receiving the trigger paddles, according to one aspect of the present disclosure.
Figure 5C:
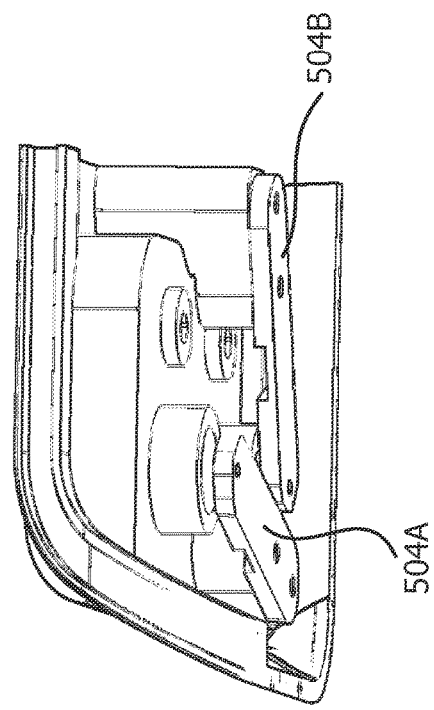
FIG. 5C provides an example of mounting the sensors of the trigger mechanism of FIG. 5A, according to one aspect of the present disclosure.

FIGS. 5A-5C show innovative proportional trigger technology used by the controller 100 assembly, according to one aspect of the present disclosure. In one aspect, the controller 100 assembly includes a plurality of trigger paddles 120A-120D (see FIG. 1E). The trigger paddles 120A-120D are configured to produce an output, e.g. a USB (Universal Serial Bus) output that is proportional to an amount of deflection. An internal, solid state sensor measures the force when the trigger paddle is used. In one aspect, the sensor is mounted to the controller 100 housing like a cantilevered beam. The sensor measures and reports an electrical signal proportional to an amount of force applied by the trigger paddle onto the sensor via a spring element.

FIG. 5A shows a front view of the controller 100 assembly with a cut-out shown as "Detail D", according to one aspect of the present disclosure. Detail D shows the trigger paddle 120A that is placed on a cylindrical element 500. The cylindrical element 500 applies pressure on a spring 502 that is coupled to a sensor 504A.

FIG. 5B show a top view of two trigger paddles 120A and 120B on the left-hand side of a portion of the flat segment 116. FIG. 5B also shows cavities 508 and 510 on the right-hand side of the flat segment 116 of the first housing component 202. Cavities 508 and 510 have openings 512 and 514 to receive the cylindrical element 500.

FIG. 5C shows the sensor 504A that is associated with trigger paddle 120A and sensor 504B associated with trigger paddle 120B.

Figure 6A:
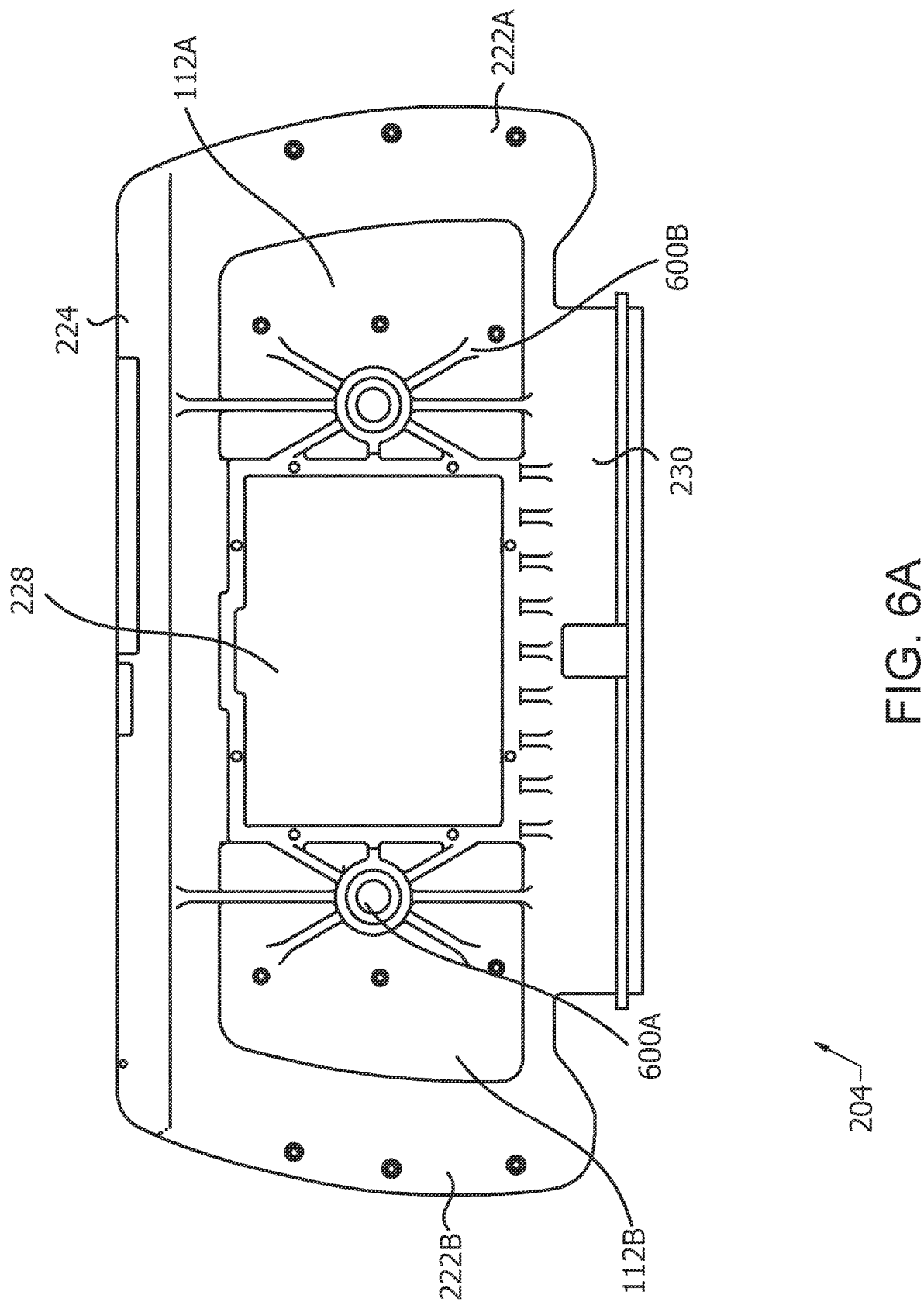
FIG. 6A shows a front view of another example of a second housing component of a controller assembly, according to one aspect of the present disclosure.
Figure 6B:
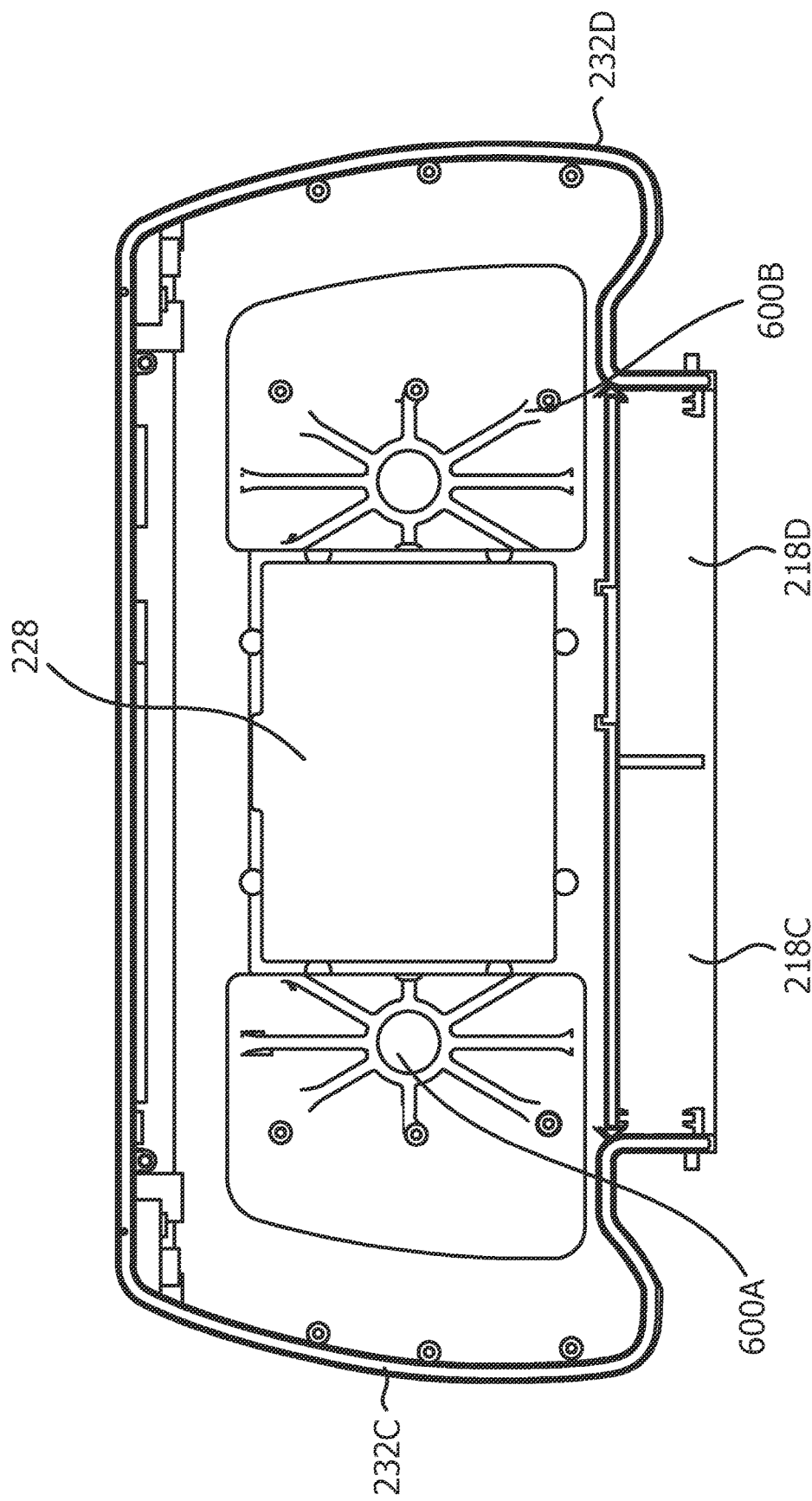
FIG. 6B shows a rear view of another example of the second housing component of FIG. 6A, according to one aspect of the present disclosure.

FIG. 6A shows a front view of another example of the second housing component 204A (shown in FIG. 2A), according to one aspect of the present disclosure. The second housing component 204A includes openings 600A and 600B that enable the controller 100 assembly to be directly mounted on a structure, for example, on an automobile or any other vehicle. FIG. 6B shows a rear view of the second housing component 204A. The second housing component 204A includes various features similar to the second housing component 204 described above, and for brevity, those features are not described again.

In one aspect, a universal controller having a housing is provided. The housing includes a first curved segment and a second curved segment, the first curved segment located on a first side of the housing and the second curved segment located on an opposite, second side of the housing, the first curved segment and the second curved segment symmetrical in shape and begin from a front surface of the housing and end at a rear surface of the housing enabling a user to grip a first side wall at a rear side of the housing and a second side wall at the rear side of the housing; and a cavity created at a bottom segment of the housing, the bottom segment coupled to a bottom support structure for receiving a first battery and a second battery to provide power to a plurality of electronic components of the universal controller.

In another aspect, the universal controller includes a heat sink installed in the rear side of the housing such that the first side wall and the second side wall where user fingers contact the universal controller are separated by a cavity in the rear side of the housing. The heat sink is coupled to a radio unit via a connector creating a channel for transferring heat generated by the radio unit to the heat sink. Furthermore, a plurality of electronic components of the universal controller are mounted on the heat sink and heat generated from the plurality of electronic components is transferred from the rear side of the housing.

In yet another aspect, the universal controller includes a plurality of trigger paddles on a flat top surface of a housing of the universal controller, each trigger paddle placed within an assigned cavity of the housing on a cylindrical segment, the cylindrical segment placed over a spring connected to a sensor, the sensor mounted on the housing as a cantilevered beam. When a trigger paddle from among the plurality of trigger paddles is pushed downwards, the sensor generates an electrical signal in proportion to a force applied on the trigger paddle.

FIG. 7A is a block diagram of electronics (referred to as system 700) within controller 100, according to one aspect of the present disclosure. In aspect system 100 includes one or more processor 702 for controlling the various operation of controller 100. Processor 702 operates as the central processing unit (CPU) of controller 100 and, thus controls its overall operation. Processor 702 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. Processor 702 executes programmable instructions (for example, an operating system including a Windows operating system (without derogation of any trademark rights), a Linux operating system (without derogation of any trademark rights), any other operating system type, application software or any other instruction) out of a memory 701 that includes any form of random access memory (RAM), read-only memory (ROM), flash memory, or the like, or a combination of such devices. Processor 702 is coupled to memory 701 via an interconnect 703 that represents any one or more separate physical buses and/or point-to-point connections, connected by appropriate bridges, adapters and/or controllers. Interconnect 703 may include, for example, a system bus, a Peripheral Component Interconnect (PCI) bus, a Hyper-Transport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

Processor 702 has access to a storage device 704, e.g. a storage device that may be, or may include any conventional medium for storing data in a non-volatile manner, such as, flash memory, a solid-state drive, one or more magnetic or optical based disks or any other type of storage medium.

Processor 702 also has access to a removable flash drive 722 that may be used to store sensitive information In one aspect, system 700 includes a power management module 706 that interfaces with a back-flex board 708. The back-flex board 708 is connected to the battery pack PCBs 211A/211B. The PCBs 211A and 211B provide battery related information. Based on battery information, LEDs 718 and 720 are activated. The LED color may indicate that the battery is fully charged (e.g. green color, needs to be recharged (e.g. yellow color) or about to be completely discharged (e.g. red color). The LED colors are controller by the power management board 706 that also controls a display 714 that is presented via opening 208 (FIG. 2A) of the first housing component 202. In one aspect, the display 714 size may vary, e.g. a 5" screen, a 7" inch screen or any other screen size.

The back-flex board 708 also receives input from triggers 120A-120D. The inputs are converted to a USB signal and provided to the processor via power management module 706.

In another aspect, system 700 includes a front PCB (shown as flex board 2) 710 that receives input from input devices 711A-711N that include joysticks, programmable D-pads, input button devices and push buttons or any other devices. Input received from the I/o devices is converted into a USB signal by a daughter card 712.

In another aspect, system 700 includes a network interface 716 for providing network connectivity to controller 100. This enables the controller 100 to communicate with remote devices (e.g., over a network). As an example, the network card 716 may be an Ethernet adapter or any other type of network interface card, include a wireless network adapter.

In one aspect, system 700 provides an interface for USB, Ethernet, VGA, head-phones and power to operate the controller while the battery packs are being charged.

In another aspect, the controller 100 includes LED indicators providing battery status, and communication status.

In one aspect, the battery packs 206A/206B are hot swappable as described below.

Figure 7B:
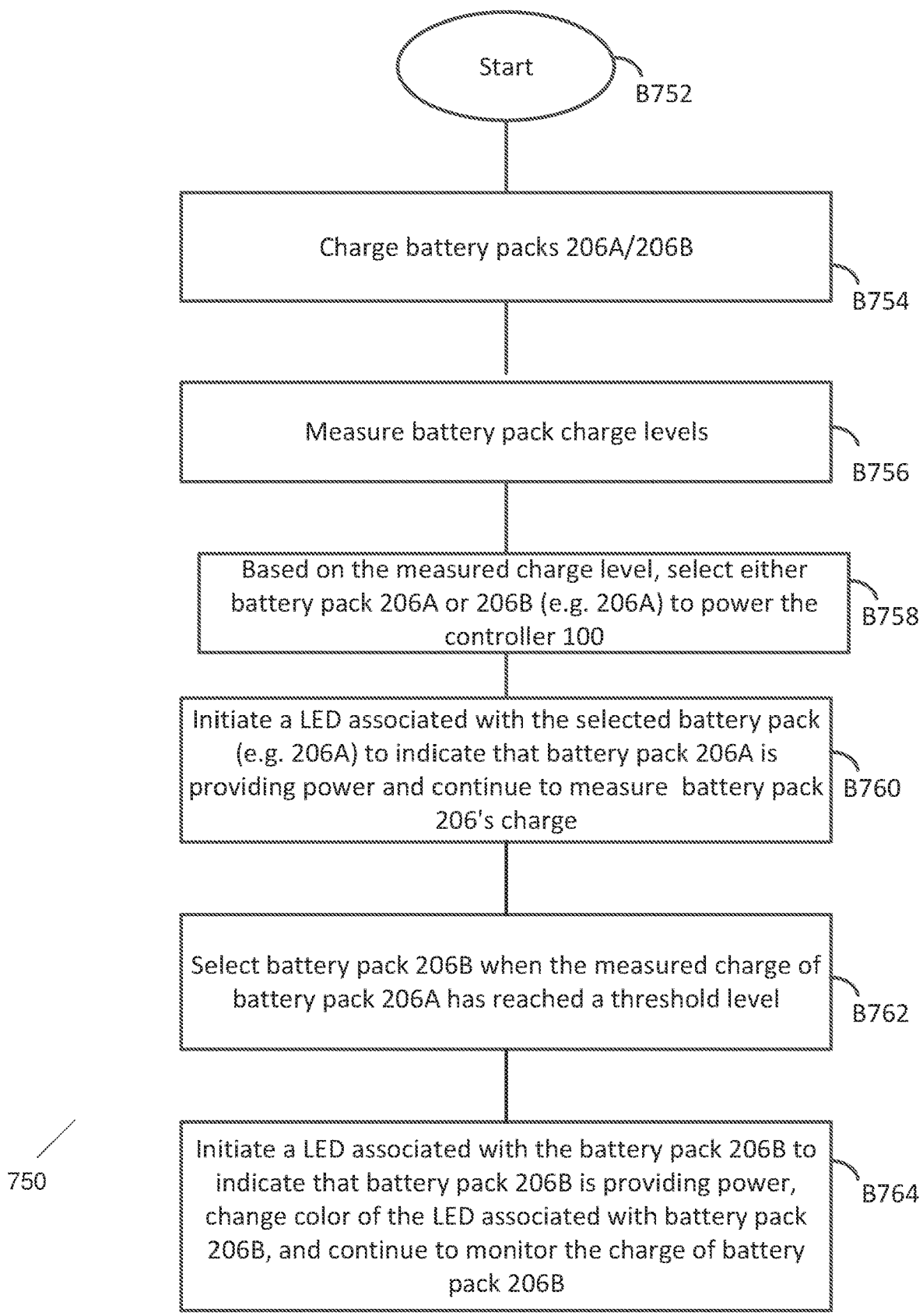
FIG. 7B is a flow diagram for managing battery packs ("batteries") of the controller assembly of FIG. 1A.

FIG. 7B shows a process 750, according to one aspect of the present disclosure. Process 750 is executed using the power management board 706 interfacing with the flex board 708 that communicates with the battery pack PCBs 211A/211B. Process 750 begins in block B752, after battery packs 206A/206B have been installed and connected to the battery pack PCBS 211A/211B. In block B754, the battery packs 206A/206B are charged using an external power charging system (not shown). The charge level of each battery pack is measured in block B756. In one aspect, the measured value is retrieved by the battery pack PCBS 211A/211B. The charge level information is provided to the power management board 706. Based on the measured value, in block B758, either battery pack 206A or 206B is selected for providing power to the controller 100. As an example, assume that battery pack 206A is selected in block B758. In block B760, the LED 718 associated with battery pack 206A is initialized. As an example, the LED 718 shows a first color (e.g. green) indicating that battery pack 206A is providing power to the controller 100. While the battery pack 206A provides power, the system continues to measure the charge at battery pack 206A. When the battery pack 206A charge reaches a threshold level, then battery pack 206B is automatically selected by the power management board 706 in block B762. The LED 720 associated with battery 206B is then initialized in block B764 to indicate that battery pack 206B is now providing power. The LED color of LED 218 associated with battery pack 206A is changed (e.g. red) indicating that battery pack 206A charge is low and it is no longer providing power.

In one aspect, dedicated LEDs indicate which battery pack is powering controller 100 at any given time and which battery pack may have lower charge. This enables an operator to hot-swap batteries without affecting controller functionality e.g. while battery pack 206B is providing power, the user may replace battery pack 206A with another battery pack.

In one aspect, a method is provided. The method includes selecting, by a processor of a universal controller, a first battery installed in the universal controller for providing power to a plurality of electronic components of the universal controller; displaying, by the processor, an indicator that the first battery is providing the power; determining, by the processor, that the first battery charge level has reached a threshold value; selecting, by the processor, for providing power to the plurality of components, a second battery installed in the universal controller, upon determining that the first battery charge level has reached the threshold value; indicating, by the processor, that the second battery is providing power to the universal controller; and replacing the first battery by a third battery in the universal controller, without interrupting power to the universal controller from the second battery.

With respect to FIGS. 7A/7B, the terms "component", "module", "system", and the like as used herein are intended to refer to a processor executable, either software-executing general-purpose processor, hardware, firmware or a combination thereof. For example, a component may be, but is not limited to being, a process running on a hardware processor, a hardware processor, an object, an executable, a thread of execution, a program, and/or a computing device.

Computer executable components can be stored, for example, at non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Thus, innovative technology for universal controllers have been described above. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
    selecting, by a processor of a universal controller, a first battery installed in a cavity created by mating a bottom segment of a housing of the universal controller with a bottom structure of the universal controller, the first battery providing power to a plurality of electronic components of the universal controller;
    displaying, by the processor, an indicator that the first battery is providing the power;
    determining, by the processor, that the first battery charge level has reached a threshold value;
    selecting, by the processor, for providing power to the plurality of components, a second battery installed in the cavity while the first battery is providing power, upon determining that the first battery charge level has reached the threshold value;
    indicating, by the processor, that the second battery is providing power to the universal controller;
    replacing the first battery by a third battery in the universal controller, without interrupting power to the universal controller from the second battery; and
    dissipating heat generated by the plurality of components by a heat sink placed within opening at a rear side of the housing, away from a user, when the user holds the universal controller facing the front surface of the housing.

2. The method of claim 1, further comprising:
    utilizing, by the processor, a light emitting diode (LED) to display the indicator that the first battery is providing the power.

3. The method of claim 1, further comprising:
    utilizing, by the processor, a light emitting diode (LED) for indicating that the second battery is providing power to the universal controller.

4. The method of claim 1, further comprising:
    monitoring, by the processor, a charge level of the second battery, while the second battery is providing power.

5. The method of claim 4, further comprising:
    selecting, by the processor, the third battery for providing power to the universal controller, when the second battery charge level reaches the threshold level.

6. The method of claim 1, wherein by mating the bottom support structure and the bottom segment of the housing creates a first compartment where the first battery is placed and a second compartment, where the second battery is placed.

7. A universal controller, comprising:
    a housing having a first curved segment and a second curved segment, the first curved segment located on a first side of the housing and the second curved segment located on an opposite, second side of the housing, the first curved segment and the second curved segment symmetrical in shape and begin from a front surface of the housing and end at a rear surface of the housing enabling a user to grip a first side wall at a rear side of the housing and a second side wall at the rear side of the housing;
    a cavity created at a bottom segment of the housing, the bottom segment coupled to a bottom support structure for receiving a first battery and a second battery to provide power to a plurality of electronic components of the universal controller;
    wherein by mating the bottom support structure and the bottom segment of the housing creates a first compartment where the first battery is placed and a second compartment, where the second battery is placed;
    wherein the first battery is replaced by a third battery, while the second battery charge level has reached a threshold value; and
    an opening at the rear side of the housing to receive a heat sink to dissipate heat generated by the plurality of components away from the user, when the user holds universal controller facing the front surface of the housing.

8. The universal controller of claim 7, wherein the heat sink is coupled to a radio unit via a connector creating a channel for transferring heat generated by the radio unit to the heat sink away from the user.

9. The universal controller of claim 7, wherein some of the plurality of electronic components of the universal controller are mounted on the heat sink and heat generated from the plurality of electronic components is transferred from the rear side of the housing away from the user.

10. The universal controller of claim 7, further comprising:
    a light emitting diode (LED) whose first color indicates that the first battery is supplying power to the universal controller, and a second color indicates that the first battery charge has reached a threshold value.

* * * * *